United States Patent
Kim

(10) Patent No.: US 10,999,884 B2
(45) Date of Patent: May 4, 2021

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventor: Dong Gun Kim, Gyeonggi-do (KR)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 16/189,127

(22) Filed: Nov. 13, 2018

(65) Prior Publication Data

US 2019/0150217 A1    May 16, 2019

(30) Foreign Application Priority Data

Nov. 10, 2017  (KR) ..................... 10-2017-0149796
Jun. 29, 2018   (KR) ..................... 10-2018-0075786

(51) Int. Cl.
| | |
|---|---|
| *H04W 76/19* | (2018.01) |
| *H04W 16/24* | (2009.01) |
| *H04L 1/18* | (2006.01) |
| *H04W 76/15* | (2018.01) |
| *H04W 76/30* | (2018.01) |
| *H04W 80/02* | (2009.01) |

(52) U.S. Cl.
CPC ............... *H04W 76/19* (2018.02); *H04L 1/18* (2013.01); *H04W 16/24* (2013.01); *H04W 76/15* (2018.02); *H04W 76/30* (2018.02); *H04W 80/02* (2013.01)

(58) Field of Classification Search
CPC ................................ H04W 76/19; H04L 1/18
See application file for complete search history.

(56) References Cited

U.S. PATENT DOCUMENTS

| | | | |
|---|---|---|---|
| 10,172,179 B2* | 1/2019 | Van Lieshout | ....... H04L 1/1829 |
| 2015/0223282 A1 | 8/2015 | Vajapeyam et al. | |
| 2016/0183103 A1* | 6/2016 | Saily | ............... H04W 36/02 370/216 |
| 2016/0277154 A1* | 9/2016 | Quan | ............... H04L 1/1621 |
| 2016/0302256 A1 | 10/2016 | Susitaival et al. | |

(Continued)

FOREIGN PATENT DOCUMENTS

| | | |
|---|---|---|
| EP | 2 139 292 | 12/2009 |
| WO | WO 2015/115854 | 8/2015 |

OTHER PUBLICATIONS

3GPP, 3rd Generation Partnership Project; Technical Specification Group Radio Access Network; Evolved Universal Terrestrial Radio Access (E-UTRA); Packet Data Convergence Protocol (PDCP) Specification (Release 14), 3GPP TS 36.323 V14.4.0, Sep. 2017, 45 pages.

(Continued)

*Primary Examiner* — Gary Mui
(74) *Attorney, Agent, or Firm* — The Farrell Law Firm, P.C.

(57) ABSTRACT

Provided is a user equipment method of transmitting and receiving data in a wireless communication system, comprising receiving a request for a packet data convergence protocol (PDCP) data recovery from an upper layer, determining at least one PDCP packet data unit (PDU), previously submitted to a re-established radio link control (RLC) entity, for which a successful delivery has not been confirmed by a lower layer, and performing a retransmission of the determined at least one PDCP PDU.

11 Claims, 12 Drawing Sheets

(56) References Cited

U.S. PATENT DOCUMENTS

| | | | |
|---|---|---|---|
| 2017/0303170 A1* | 10/2017 | Uchino | H04W 16/32 |
| 2018/0035483 A1* | 2/2018 | Nagasaka | H04W 72/0406 |
| 2018/0092146 A1* | 3/2018 | Hong | H04W 76/15 |
| 2018/0324641 A1* | 11/2018 | Tsai | H04L 69/321 |
| 2019/0104560 A1* | 4/2019 | Nuggehalli | H04W 28/08 |
| 2019/0141550 A1* | 5/2019 | Yi | H04L 43/0852 |
| 2019/0141773 A1* | 5/2019 | Kim | H04W 76/34 |
| 2019/0190657 A1* | 6/2019 | Sun | H04L 1/08 |
| 2020/0037382 A1* | 1/2020 | Xiao | H04W 76/20 |
| 2020/0107215 A1* | 4/2020 | Lee | H04W 28/0252 |

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol Specification (Release 13), 3GPP TS 36.331 V13.7.1, Sep. 2017, 642 pages.

3GPP, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14), 3GPP TS 36.300 V14.4.0, Sep. 2017, 319 pages.

International Search Report dated Feb. 25, 2019 issued in counterpart application No. PCT/KR2018/013653, 12 pages.

Huawei, HiSilicon, "Analysis of Latency Related Issues for UP Protocol Alternatives", R2-131786, 3GPP TSG-RAN WG2 Meeting #82, May 20-24, 2013, 6 pages.

Kyocera, "User Plane Aspects to Support Uplink Split Bearer", R2-151539, 3GPP TSG-RAN WG2 #89-bis, Apr. 20-24, 2015, 5 pages.

NTT Docomo, Inc., "UE Autonomous UL Direction Change", R2-1709660, 3GPP TSG-RAN WG2 Meeting #99, Aug. 21-25, 2017, 1 page.

European Search Report dated Jul. 31, 2020 issued in counterpart application No. 18875352.9-1231, 11 pages.

* cited by examiner

METHOD AND APPARATUS FOR TRANSMITTING AND RECEIVING DATA IN WIRELESS COMMUNICATION SYSTEM

PRIORITY

This application is based on and claims priority under 35 U.S.C. § 119 to Korean Patent Application Nos. 10-2017-0149796 and 10-2018-0075786, filed on Nov. 10, 2017 and Jun. 29, 2018, respectively, in the Korean Intellectual Property Office, the disclosures of each of which are incorporated by reference herein in their entireties.

BACKGROUND

1. Field

The disclosure relates generally to wireless communication systems, and more particularly, to methods and apparatuses for transmitting and receiving data for reducing a data transmission delay in a wireless communication system.

2. Description of Related Art

To meet the increase in the demand for wireless data traffic after the commercialization of Fourth generation (4G) communication systems, efforts has been made to develop an improved Fifth generation (5G) communication system or a pre-5G communication system, which are also referred to as 'beyond 4G network communication systems' or 'post long term evolution (LTE) systems'. In order to achieve a high data transmission rate, 5G communication systems are being developed to be implemented in a band of extremely high frequency, or millimeter wave (mmWave), such as a 60 gigahertz (GHz) band. In order to reduce the occurrence of stray electric waves in a band of extremely high frequency and to increase the transmission distance of electric waves in 5G communication systems, various technologies such as beamforming, massive multiple input multiple output (MIMO), full dimensional MIMO (FD-MIMO), array antennas, analog beam-forming, and large scale antennas are being actively researched.

In order to improve system networks for 5G communication systems, various technologies such as evolved small cell, advanced small cell, cloud radio access network (cloud RAN), ultra-dense network, device-to-device communication (D2D), wireless backhaul, moving network, cooperative communication, coordinated multi-points (CoMP), and interference cancellation have been developed. Other technologies such as hybrid modulation of frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), sparse code multiple access (SCMA), have been developed for 5G communication systems.

The Internet has evolved from a human-based connection network, where humans create and consume information, to the Internet of things (IoT), where distributed configurations, such as objects, exchange information with each other to process the information. More recent times have seen the introduction of the Internet of everything (IoE) technology, in which technology related to the IoT is combined with technology for processing big data through connection with a cloud server. In order to implement the IoT, various technical components are required, such as a sensing technique, wired/wireless communication and network infrastructures, a service interfacing technique and a security technique.

In recent years, techniques including a sensor network for connecting objects, machine to machine (M2M) communication, and machine type communication (MTC) have been researched. In the IoT environment, intelligent Internet technology services may be provided to collect and analyze data obtained from objects connected to each other, and thus, to create a new value for human life. As existing information technology (IT) techniques and various industries are converged and combined therebetween, the IoT may be applied to various fields, such as smart homes, smart buildings, smart cities, smart cars or connected cars, smart grids, health care, smart home appliances, and high quality medical services.

Various attempts are being made to apply 5G communication systems to the IoT network. For example, various technologies related to sensor networks, M2M communication, and MTC, are implemented by using beam-forming, MIMO, and an array antenna, for example. The application of the cloud RAN as a big data processing technique described above may be an example of convergence of the 5G communication technology and the IoT technology.

In order to meet the increasing demand for large communication capacity, a number of techniques such as a method of providing a number of connections has been proposed. In an LTE system, a carrier aggregation (CA) technique may provide a number of connections by using a number of carriers, so that users may receive services via a number of resources. Also, various services including a multimedia broadcast multicast service (MBMS) may be provided through the LTE system.

In the existing art, however, there is a shortcoming in that transmission delay often occurs in the 5G communication technology. Thus, there is a need in the art for a method and apparatus that mitigate such transmission delay.

SUMMARY

An aspect of the disclosure is to address at least the above-mentioned problems and/or disadvantages and to provide at least the advantages described below. Accordingly, an aspect of the disclosure is to provide methods and apparatuses for transmitting and receiving data for reducing a data transmission delay.

Another aspect of the disclosure is to provide methods and apparatuses in which an equipment supporting a dual connectivity (DC) in a wireless communication system further efficiently performs a procedure of retransmitting data when a base station to which the equipment is connected is changed.

In accordance with an aspect of the disclosure, a method, performed by a user equipment (UE), of transmitting and receiving data in a wireless communication system, includes receiving a request for a packet data convergence protocol (PDCP) data recovery from an upper layer, determining at least one PDCP packet data unit (PDU), previously submitted to a re-established radio link control (RLC) entity, for which a successful delivery has not been confirmed by a lower layer, and performing a retransmission of the determined at least one PDCP PDU.

In accordance with another aspect of the disclosure, a method, performed by a UE, of transmitting and receiving data in a wireless communication system includes obtaining a PDCP status report, confirming whether a PDCP service data unit (SDU) is successfully delivered based on the PDCP status report, and discarding the PDCP SDU in response to a successful delivery of the PDCP SDU being confirmed.

In accordance with another aspect of the disclosure, a UE for transmitting and receiving data in a wireless communication system includes a transceiver, and at least one controller coupled with the transceiver and configured to receive a request for a PDCP data recovery from an upper layer, determine at least one PDCP PDU, previously submitted to an RLC entity, for which a successful delivery has not been confirmed by a lower layer, and perform a retransmission of the determined PDCP PDU.

In accordance with another aspect of the disclosure, a UE for transmitting and receiving data in a wireless communication system includes a transceiver, and at least one controller coupled with the transceiver and configured to obtain a PDCP status report, confirm whether a PDCP SDU is successfully delivered based on the PDCP status report, and discard the PDCP SDU in response to a successful delivery of the PDCP SDU being confirmed.

In accordance with another aspect of the disclosure, a non-transitory computer-readable recording medium is disclosed having recorded thereon a program for executing a method, performed by a UE, of transmitting and receiving data in a wireless communication system, including receiving a request for a PDCP data recovery from an upper layer, determining at least one PDCP PDU, previously submitted to a re-established RLC entity, for which a successful delivery has not been confirmed by a lower layer, and performing a retransmission of the determined at least one PDCP PDU.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, the present disclosure will be described in detail with reference to the accompanying drawings. Detailed descriptions of known functions and configurations incorporated herein will be omitted when it may make the subject matter of the present disclosure rather unclear. The following terms are defined in consideration of the functions of the present disclosure, and may be changed according to the intention of the user, the operator, or custom, for example. Therefore, the definition should be based on the contents throughout the present specification.

In the following description, terms used for identifying an access node, referring to a network entity, referring to messages, indicating an interface between network objects, and indicating various pieces of identification information, are provided for convenience of description. Therefore, the present disclosure is not limited to the following terms, and other terms referring to objects having equivalent technical meanings may be used.

For convenience of description, the present disclosure uses terms and names defined in the 3rd generation partnership project long term evolution (3GPP LTE) standard. However, the present disclosure is not limited by the above-mentioned terms and names, and may be equally applied to systems conforming to other standards.

Figure 1:
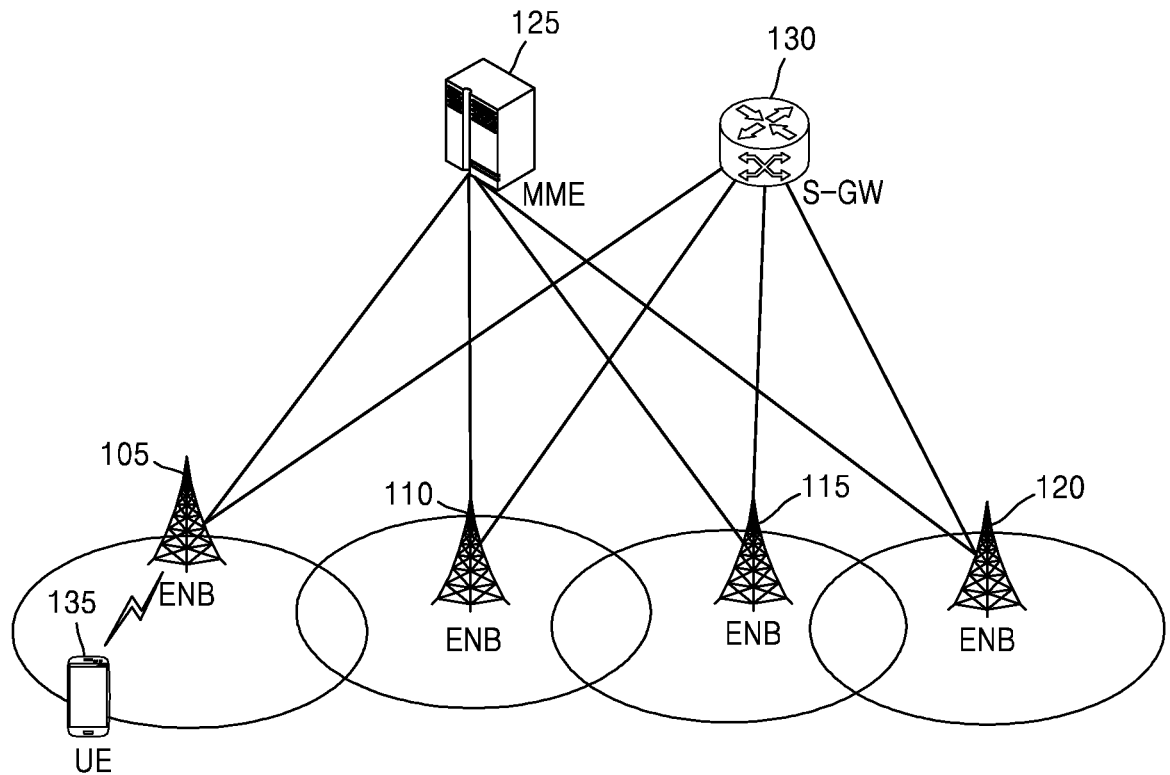
FIG. 1 illustrates a structure of a long term evolution (LTE) system to which embodiments of the present disclosure are applicable.

FIG. 1 illustrates a structure of an LTE system to which embodiments of the present disclosure are applicable.

Referring to FIG. 1, a RAN of the LTE system may include evolved nodes B (eNBs, nodes B or base stations) 105, 110, 115, and 120, a mobility management entity (MME) 125, and a serving-gateway (S-GW) 130. A UE 135 may access an external network through the eNBs 105 to 120 and the S-GW 130.

In FIG. 1, the eNBs 105 to 120 may each correspond to the existing Node B of the universal mobile telecommunications system (UMTS). At least one of the dNBs 105 to 120 may be connected to the UE 135 via a wireless channel and may perform a more complex role than the existing Node B. In the LTE system, because all user traffic including a real-time service such as voice over Internet protocol (VoIP) through the Internet protocol is serviced through a shared channel, there is a need for a device for collecting and scheduling status information such as a buffer status of UEs, an available transmission power status, and a channel status, which may be performed by the eNBs 105 to 120. One eNB may normally control a plurality of cells. For example, to realize a transmission rate of 100 megabits per second (Mbps), the LTE system may use orthogonal frequency division multiplexing (OFDM) as a radio access technique at a bandwidth of 20 megahertz (MHz) and may apply adaptive modulation and coding (AMC) which determines a modulation scheme and a channel coding rate according to the channel status of the UE 135. The S-GW 130 provides a data bearer and may generate or remove the data bearer by the control of the MME 125, which performs various control functions as well as a mobility management function with respect to the UE 135 and may be connected to a plurality of base stations.

Figure 2:
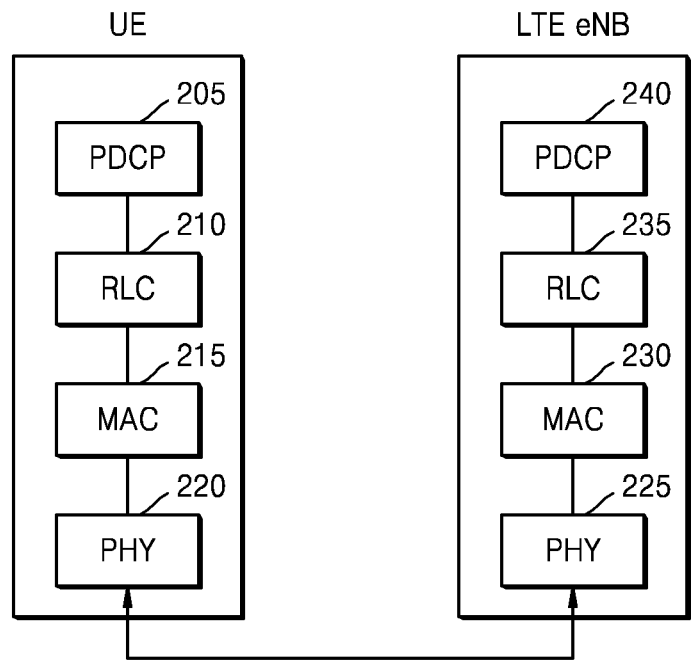
FIG. 2 illustrates a wireless protocol structure in an LTE system to which embodiments of the present disclosure are applicable.

FIG. 2 illustrates a wireless protocol structure in an LTE system to which embodiments of the present disclosure are applicable.

Referring to FIG. 2, the wireless protocol structure of the LTE system may include packet data convergence protocols (PDCPs) 205 and 240, radio link controls (RLCs) 210 and 235, medium access controls (MACs) 215 and 230, and physical layers (PHYs) 220 and 225 respectively in a UE and an LTE eNB. The PDCPs 205 and 240 may perform operations such as IP header compression/decompression. The main functions of the PDCPs 205 and 240 may be summarized as follows.

- Header compression and decompression (robust header compression (ROHC) only))
- Transfer of user data
- In-sequence delivery of upper layer PDUs at a PDCP re-establishment procedure for RLC acknowledged mode (AM)
- For split bearers in DC (RLC AM): PDCP PDU routing for transmission and PDCP PDU reordering for reception
- Duplicate detection of lower layer SDUs at a PDCP re-establishment procedure for RLC AM
- Retransmission function PDCP SDUs at handover and for split bearers in DC, PDCP PDUs at PDCP data-recovery procedure, for RLC AM
- Ciphering and deciphering functions
- Timer-based SDU discard in an uplink The RLCs 210 and 235 may reconfigure a PDCP PDU to an appropriate size to perform an automatic repeat request (ARQ) operation or the like. The main functions of the RLCs 210 and 235 may be summarized as follows.

- Transfer of upper layer PDUs
- Error correction through an ARQ (only for AM data transfer)
- Concatenation, segmentation and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 215 and 230 may be connected to a plurality of RLC layer devices configured in one UE, and may perform operations of multiplexing RLC PDUs into MAC PDUs and demultiplexing RLC PDUs from MAC PDUs.

The main functions of the MACs 215 and 230 may be summarized as follows.

- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- Error correction through HARQ
- Priority handling between logical channels of one UE
- Priority handling between UEs by means of dynamic scheduling
- MBMS service identification
- Transport format selection
- Padding The PHYs 220 and 225 may perform channel encoding and modulation on upper layer data and transmit OFDM symbols via a wireless channel by converting the upper layer data to the OFDM symbols, or may demodulate OFDM symbols received via the wireless channel, perform channel decoding on the OFDM symbols and transmit decoded data to an upper layer.

Figure 3:
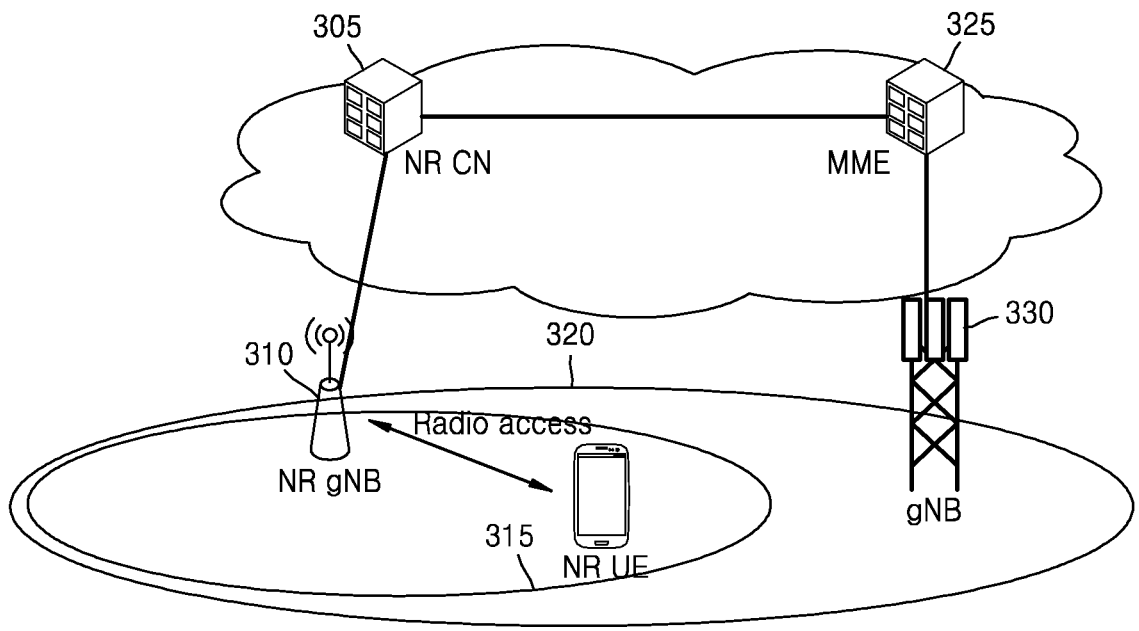
FIG. 3 illustrates a structure of a next generation mobile communication system to which embodiments of the present disclosure are applicable.

FIG. 3 illustrates a structure of a next generation mobile communication system to which embodiments of the present disclosure are applicable.

Referring to FIG. 3, a RAN of the next generation mobile communication system (hereinafter, referred to as new radio (NR) or 5G) may include a new radio node B (NR gNB or NR base station) 310 and a new radio core network (NR CN) 305. A new radio UE (NR UE or equipment) 315 may access an external network through the NR gNB 310 and the NR CN 305.

In FIG. 3, the NR gNB 310 may correspond to an eNB of an existing LTE system. The NR gNB 310 may be connected to the NR UE 315 via a wireless channel and may provide a better service than the existing Node B. In the next generation mobile communication system, because all user traffic is serviced through a shared channel, there is a need for a device for collecting and scheduling status information such as a buffer status of UEs, an available transmission power status, and a channel status, which may be performed by the NR NB 310. One NR gNB may control multiple cells.

To implement ultra high-speed data transmission compared with the current LTE, an existing maximum bandwidth may be given, and a beam-forming technique may be additionally applied by using OFDM as a radio access technique. Also, AMC may be applied, as described above.

The NR CN 305 performs functions such as a mobility support function, a bearer setup function, and a QoS setup function, and performs various control functions as well as a mobility management function with respect to the NR UE 315, and may be connected to a plurality of base stations. The next generation mobile communication system may interact with the existing LTE system. The NR CN 305 may be connected to the MME 325 through a network interface. The MME 325 may be connected to a gNB 330 which is an existing base station.

Figure 4:
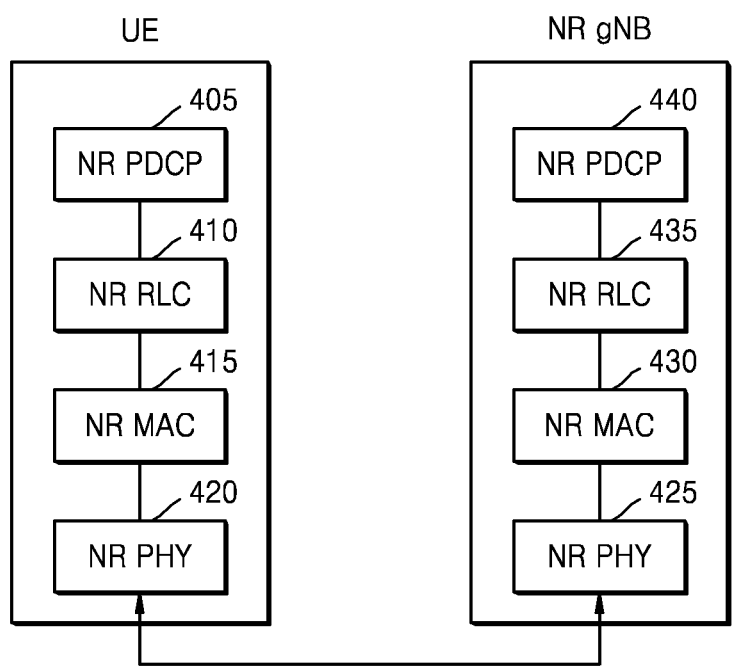
FIG. 4 illustrates a wireless protocol structure of a next generation mobile communication system to which embodiments of the present disclosure are applicable.

FIG. 4 illustrates a wireless protocol structure of a next generation mobile communication system to which embodiments of the present disclosure are applicable.

Referring to FIG. 4, the wireless protocol structure of the next generation mobile communication system may include NR PDCPs 405 and 440, NR RLCs 410 and 435, NR MACs 415 and 430, and NR PHYs 420 and 425 in a UE and an NR gNB, respectively.

The main functions of the NR PDCPs 405 and 440 may include the following.

- Header compression and decompression (ROHC only)
- Transfer of user data
- In-sequence delivery of upper layer PDUs
- PDCP PDU reordering for reception
- Duplicate detection of lower layer SDUs
- Retransmission of PDCP SDUs
- Ciphering and deciphering function
- Timer-based SDU discard in uplink In the foregoing, reordering for reception of the NR PDCPs 405 and 440 may represent sequential reordering of PDCP PDUs received from a lower layer based on PDCP sequence number (SN), and may include at least one of delivering data to an upper layer in the reordered order, reordering and recording lost PDCP PDUs, transmitting a status report regarding the lost PDCP PDUs to a transmitter, and requesting retransmission of the lost PDCP PDUs.

The main functions of the NR RLCs 410 and 435 may include the following.

Transfer of an upper layer PDU
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection function
Protocol error detection
RLC SDU discard
RLC re-establishment The in-sequence delivery of the NR RLCs 410 and 435 may represent sequentially delivering RLC SDUs received from a lower layer to an upper layer, and when one RLC SDU which has been segmented into a plurality of RLC SDUs is received, may include reassembling and delivering the plurality of RLC SDUs. The sequential delivery may include at least one of reordering the received RLC PDUs based on RLC sequence number (SN) or PDCP SN, reordering and recording lost RLC PDUs, transmitting a status report regarding the lost RLC PDUs to a transmitter, and requesting retransmission of the lost RLC PDUs. When there is a lost RLC SDU, the sequential delivery may include sequentially delivering only the RLC SDUs before the lost RLC SDU to the upper layer, and sequentially delivering, to the upper layer, all RLC SDUs received before a predetermined timer starts even when there is the lost RLC SDU when the timer expired, or may include sequentially delivering all RLC SDUs received up to now to the upper layer even when there is the lost RLC SDU and the timer expired.

The NR RLCs 410 and 435 may process the RLC PDUs in the order of arrival reception (in the order of arrival irrespective of the order of sequence numbers), and deliver the RLC PDUs to the NR PDCPs 405 and 440 out-of-sequence delivery. In the case of a segment, the NR RLCs 410 and 435 may receive segments stored in a buffer or to be received at a later time, reconfigure the segments into one RLC PDU, and then process and deliver the RLC PDU to the NR PDCPs 405 and 440. The NR RLCs 410 and 435 may not include a concatenation function which may be performed by the NR MACs 415 and 430 or may be replaced by a multiplexing function of the NR MACs 415 and 430.

The out-of-sequence delivery of the NR RLCs 410 and 435 may represent delivering the RLC SDUs received from the lower layer directly to the upper layer, regardless of the order. When one RLC SDU which has been segmented into a plurality of RLC SDUs is received, the out-of-sequence delivery may include reassembling and delivering the plurality of RLC SDUs, storing an RLC SN or PDCP SN of the received RLC PDUs and ordering thereof, and recording of lost RLC PDUs.

The NR MACs 415 and 430 may be connected to a plurality of NR RLCs configured in one UE, and the main functions of the NR MACs 415 and 430 may include the following.

Mapping between logical channels and transport channels.
Multiplexing/demultiplexing of MAC SDUs
Scheduling information reporting function
Error correction through HARQ
Priority handling between logical channels of one UE
Priority handling between UEs by means of dynamic scheduling
MBMS service identification
Transport format selection
Padding The NR PHYs 420 and 425 may perform channel encoding and modulation on upper layer data and transmit OFDM symbols via a wireless channel by converting the upper layer data into the OFDM symbols. The NR PHYs 420 and 425 may demodulate OFDM symbols received via the wireless channel, perform channel decoding on the OFDM symbols and transmit decoded data to the upper layer.

Figure 5:
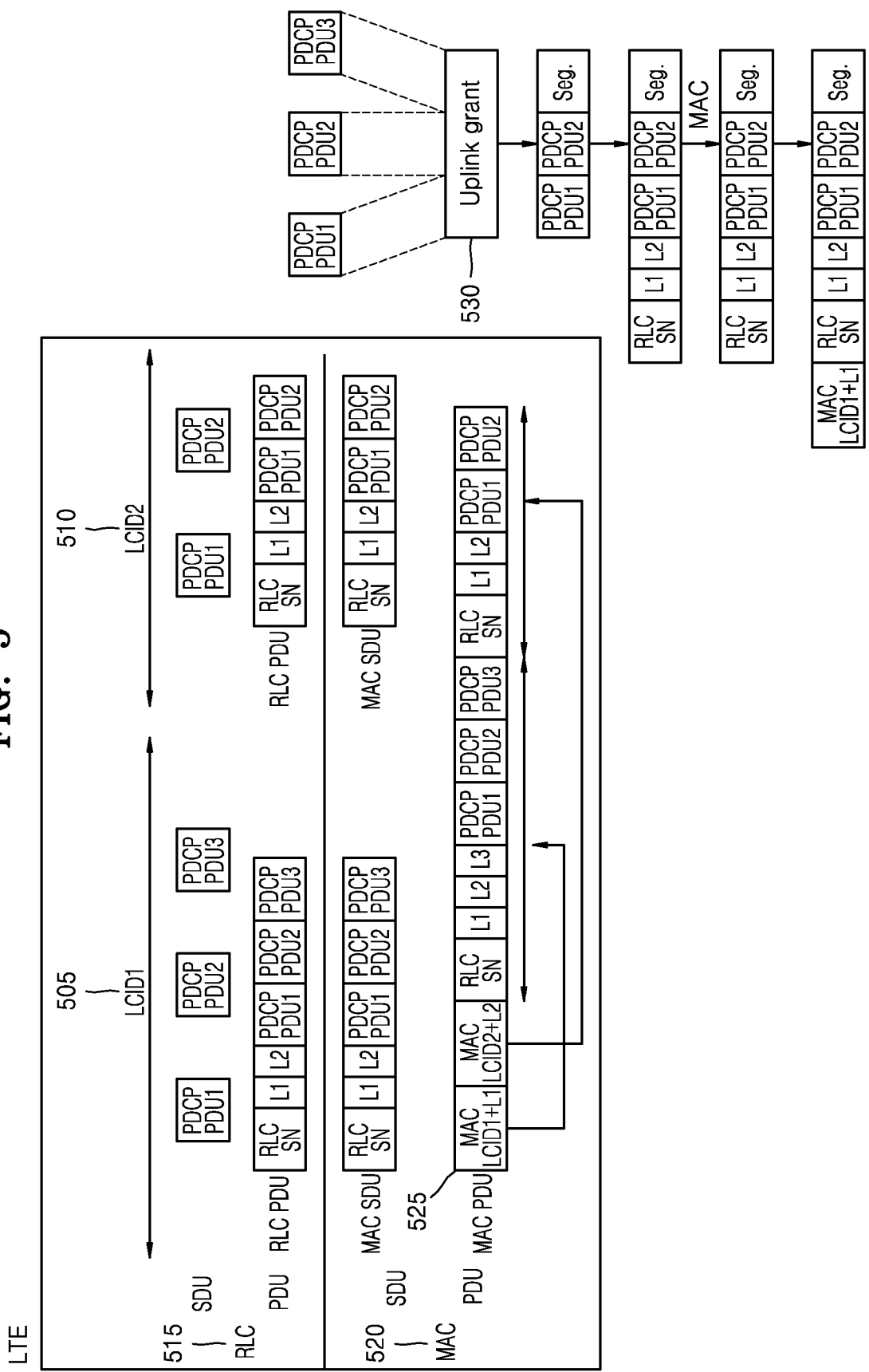
FIG. 5 illustrates a structure for processing data in an LTE system, according to an embodiment.

FIG. 5 illustrates a structure for processing data in an LTE system, according to an embodiment.

As shown in FIG. 5, in the LTE system, a PDCP layer apparatus and an RLC layer apparatus may perform data processing for each logical channel. That is, a logical channel 1 LCID1 505 and a logical channel 2 LCID2 510 may have different PDCP layer apparatuses and RLC layer apparatuses and perform independent data processing. Then, an RLC PDU generated from an RLC layer apparatus of each logical channel may be delivered to a MAC layer apparatus and may be configured as one MAC PDU, and then may be transmitted to a receiving end. In the LTE system, the PDCP layer apparatus, the RLC layer apparatus, and the MAC layer apparatus may include the functions described above with reference to FIG. 4, and may perform operations corresponding thereto.

The LTE system is characterized in that the RLC layer apparatus concatenates PDCP PDUs. The LTE system is characterized in its structure in which all MAC subheaders are located in the front and a MAC SDU part is located in the rear of the MAC PDU as in a MAC PDU structure 525 shown in FIG. 5. Due to the above-described characteristics, in the LTE system, the RLC layer apparatus may not perform or prepare data processing before an uplink grant 530 is received.

As shown in FIG. 5, when the uplink grant 530 is received, a UE may generate the RLC PDUs by concatenating PDCP PDUs received from the PDCP layer apparatus in accordance with the uplink grant 530. After the UE receives the uplink grant 530 from a base station via the MAC layer apparatus, the UE may perform logical channel prioritization (LCP) and allocate the uplink grant 530 to each logical channel. That is, the uplink grant 530 may be allocated from the MAC layer apparatus. When the size of the PDCP PDUs to be concatenated does not match the uplink grant 530, the RLC layer apparatus may perform, for each logical channel, a segmentation procedure to match the PDCP PDUs with the uplink grant 530. Each RLC layer apparatus may configure an RLC header by using the concatenated PDCP PDUs and send a completed RLC PDU to the MAC layer apparatus, which may configure the RLC PDUs (MAC SDUs) received from the respective RLC layer apparatuses as one MAC PDU to send one MAC PDU to a PHY layer apparatus for transmission. When the RLC layer apparatus performs a segmentation operation when configuring the RLC header, and segmented information is included in the RLC header, length information of each of the concatenated PDCP PDUs may be included in the RLC header for reassembly at the receiving end.

As described above, in the LTE system, the data processing of the RLC layer apparatus, the MAC layer apparatus, and the PHY layer apparatus may be started when the uplink grant 530 is received.

Figure 6:
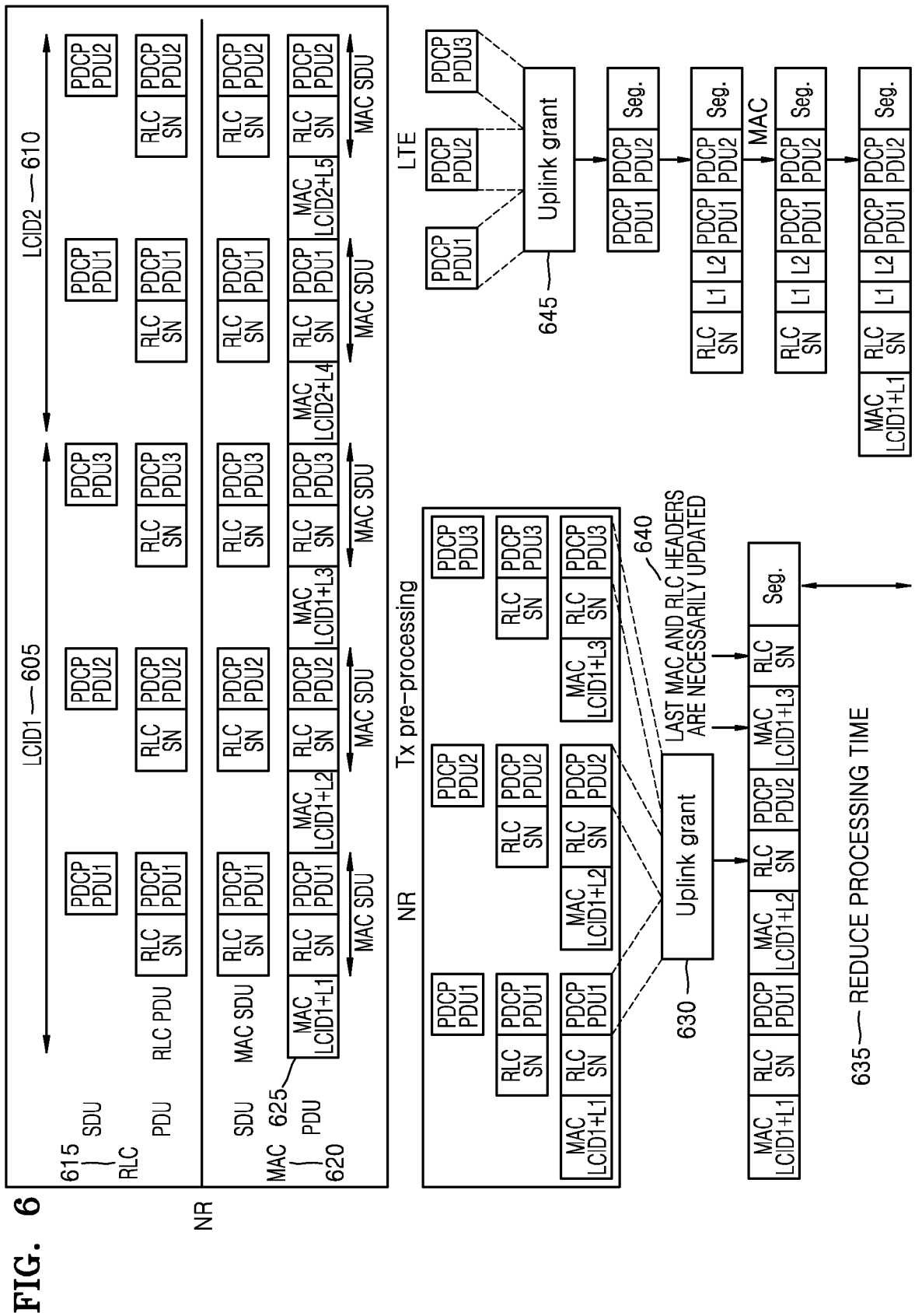
FIG. 6 illustrates a structure for processing data in a next generation mobile communication system, according to an embodiment.

FIG. 6 illustrates a structure for processing data in a next generation mobile communication system according to an embodiment.

As shown in FIG. 6, in the next generation mobile communication system, data processing of a PDCP layer and an RLC layer may be performed for each logical channel. That is, a logical channel D1 605 and a logical channel D2 610 may have different PDCP layer apparatuses and RLC layer apparatuses and perform independent data processing. An RLC PDU generated from an RLC layer apparatus 615 of each logical channel may be delivered to a MAC layer apparatus 620 and may be configured as one MAC PDU, and then may be transmitted to a receiving end. In the next generation mobile communication system, a PDCP layer apparatus, the RLC layer apparatus 615, and the MAC layer apparatus 620 may include the functions described above with reference to FIG. 4 and perform operations corresponding thereto.

The next generation mobile communication system is characterized in that the RLC layer apparatus 615 does not concatenate PDCP PDUs. As shown in FIG. 6, the next generation mobile communication system is characterized in its structure in which a MAC PDU structure 625 has a MAC subheader for each MAC SDU, that is, a structure in which a MAC subheader and a MAC SDU unit are repeated.

Therefore, in the next generation mobile communication system, pre-processing may be performed on data before an uplink grant 630 is received. That is, when a UE receives an IP packet from the PDCP layer apparatus before the UE receives the uplink grant 630, the UE may perform PDCP processing such as ciphering and integrity protection on the IP packet, generate a PDCP header and a PDCP PDU, and deliver the generated PDCP PDU to the RLC layer apparatus 615 to configure an RLC header and an RLC PDU, and deliver the RLC PDU to the MAC layer apparatus 620 to previously configure the MAC subheader and the MAC SDU.

However, this is only an example, and the UE may alternatively perform data pre-processing only to the RLC layer apparatus 615 and process the data in the MAC layer apparatus 620 when the uplink grant 630 is received. Alternatively, the UE may perform data pre-processing only on one of the PDCP header, the RLC header, and the MAC header to generate and separately process the headers. That is, before the UE receives the uplink grant 630, the UE may separately perform data pre-processing on headers to generate the headers, and when the UE receives the uplink grant 630, the UE may concatenate the headers and the data to configure the PDCP PDU, the RLC PDU, or the MAC PDU.

When data pre-processing is not implemented in the UE, data processing may be performed after receiving the uplink grant 630 as in the LTE system. That is, when the uplink grant 630 is allocated to each logical channel after an LCP procedure is performed, the UE may configure the PDCP header by considering the size of the allocated LCP, generate the PDCP PDU, configure the RLC header to generate the RLC PDU, and configure the MAC subheader and the MAC SDU. When data pre-processing is not implemented in the next generation mobile communication system, a difference between the next generation mobile communication system and the LTE system is that the RLC layer apparatus 615 does not concatenate data.

In the next generation mobile communication system, when the UE receives the uplink grant 630, the UE may configure the MAC PDU by fetching MAC subheaders and MAC SDUs corresponding to the size of the uplink grant 630. Alternatively, when the UE performs data pre-processing in the RLC layer apparatus 615, the MAC layer apparatus 620 may receive the RLC PDU from each RLC layer apparatus 615 and configure and multiplex the MAC subheader and the MAC SDUs in accordance with the uplink grant 630 to configure the MAC PDU. The MAC subheader may also be pre-processed.

When the uplink grant 630 is insufficient, the UE may perform a segmentation operation for efficient use of all the uplink grant 630. When the segmentation operation is performed, the RLC header and the MAC header corresponding to the segmentation operation may be updated (640). For example, the segmentation information or length information may be included in the RLC header, and an L field corresponding to the length information of the MAC header may be updated.

Therefore, when reception of the uplink grant 630 in the next generation mobile communication system and reception of an uplink grant 645 in the LTE system are simultaneously performed, the next generation mobile communication system may realize a reduced processing time 635.

The RLC layer apparatus 615 and the PDCP layer apparatus may use one common sequence number when necessary or when set in a network.

The pre-processing operation may be performed for each logical channel, and, according to an embodiment, the RLC PDUs pre-processed for each logical channel may be further pre-processed to MAC SDUs and MAC subheaders in the MAC layer apparatus 620. The MAC layer apparatus 620 may also perform data processing only when the uplink grant 630 is allocated, or the MAC subheader may be previously generated.

When the MAC layer apparatus 620 receives the uplink grant 630, the UE may allocate the uplink grant 630 to each logical channel and multiplex the pre-generated MAC SDUs and MAC subheaders.

When the MAC layer apparatus 620 receives the uplink grant 630 from a base station, the LCP operation may be performed, and accordingly, the MAC layer apparatus 620 may be allocated to each logical channel. The MAC layer apparatus 620 may perform data pre-processing for each logical channel, configure the pre-generated MAC SDUs and MAC subheaders in accordance with the uplink grant 630 for each logical channel, and multiplex data for each logical channel to configure one MAC PDU and deliver the MAC PDU to a PHY layer apparatus.

When the uplink grant 630 allocated to each logical channel is insufficient, the MAC layer apparatus 620 may request the RLC layer apparatus 615 to segment data. When a segmentation operation is performed by the RLC layer apparatus 615, information about segmentation is included in the header such that the header is updated and delivered to the MAC layer apparatus 620. The MAC layer apparatus 620 may update a MAC header corresponding to and based on the delivered header.

As described above, the next generation mobile communication system is characterized in that data processing of the PDCP layer apparatus, the RLC layer apparatus 615, or the MAC layer apparatus 620 may be performed before the uplink grant 630 is received. When data pre-processing is not implemented, the next generation mobile communication system may perform data processing after the uplink grant 630 is received, as in the LTE system. That is, when the uplink grant 630 is allocated to each logical channel after the LCP procedure is performed, the next generation mobile communication system may configure the PDCP header by considering the size of the allocated uplink grant 630 to generate the PDCP PDU, configure the RLC header to generate the RLC PDU, and configure the MAC subheader and the MAC SDU. When data pre-processing is not implemented in the next generation mobile communication system, the RLC layer apparatus 615 does not concatenate data, in contrast with the LTE system.

The procedure for performing data pre-processing in the present disclosure may be applied to the following first, second, and third embodiments of the present disclosure.

First Embodiment of Data Pre-processing: Each PDCP layer apparatus may cipher a PDCP SDU (an IP packet or a data packet), perform integrity protection when necessary, and generate a PDCP header, and each RLC layer apparatus may allocate an RLC sequence number, set a segmentation information (SI) field, and configure an RLC header to complete data pre-processing. When a MAC layer apparatus is satisfied with respect to a predetermined condition and instructs each RLC layer apparatus, in order for each MAC layer apparatus to process a data pre-processed RLC PDU, each RLC layer apparatus may set a length L field corresponding to the size of the RLC PDU, set a logical channel identifier (LCID) for each RLC layer apparatus, configure a MAC header, configure and multiplex each MAC subheader and MAC SDU to configure the MAC PDU in accordance with the size of an uplink grant. The predetermined condition of the MAC layer apparatus may be reception of the uplink grant from the base station, and when the MAC layer apparatus receives the uplink grant, the MAC layer apparatus may instruct each RLC layer apparatus to deliver the data pre-processed RLC PDUs to the MAC layer apparatus.

Second Embodiment of Data Pre-Processing: Each PDCP header and RLC header may be separately generated, stored and managed when the first embodiment of data pre-processing is performed. When it is necessary to perform a segmentation operation due to a shortage of grant after the uplink grant is received, the UE may update an SI field of the generated RLC header (01 in a first segment, 10 in a last segment, and 11 not in either the first segment or the last segment), when necessary, a segment offset (SO) field may be dynamically added to the RLC header. For example, when it is not the first segment, the UE may add a 2-byte size SO field and instruct an offset.

Third Embodiment of Data Pre-processing: The first embodiment of data pre-processing may be performed, but a UE may perform data processing of a MAC layer apparatus before an uplink grant is received. At this time, the UE may separately generate, store, and manage each PDCP header, each RLC header, and each MAC header. When it is necessary to perform a segmentation operation due to a shortage of an uplink grant after the uplink grant is received, the UE may update an SI field of the generated RLC header (01 in a first segment, 10 in a last segment, and 11 not in both the first segment and the last segment), when necessary, a segment offset (SO) field may be dynamically added to the RLC header. For example, the UE may add a 2-byte size SO field and instruct an offset when it is not the first segment.

Figure 7:
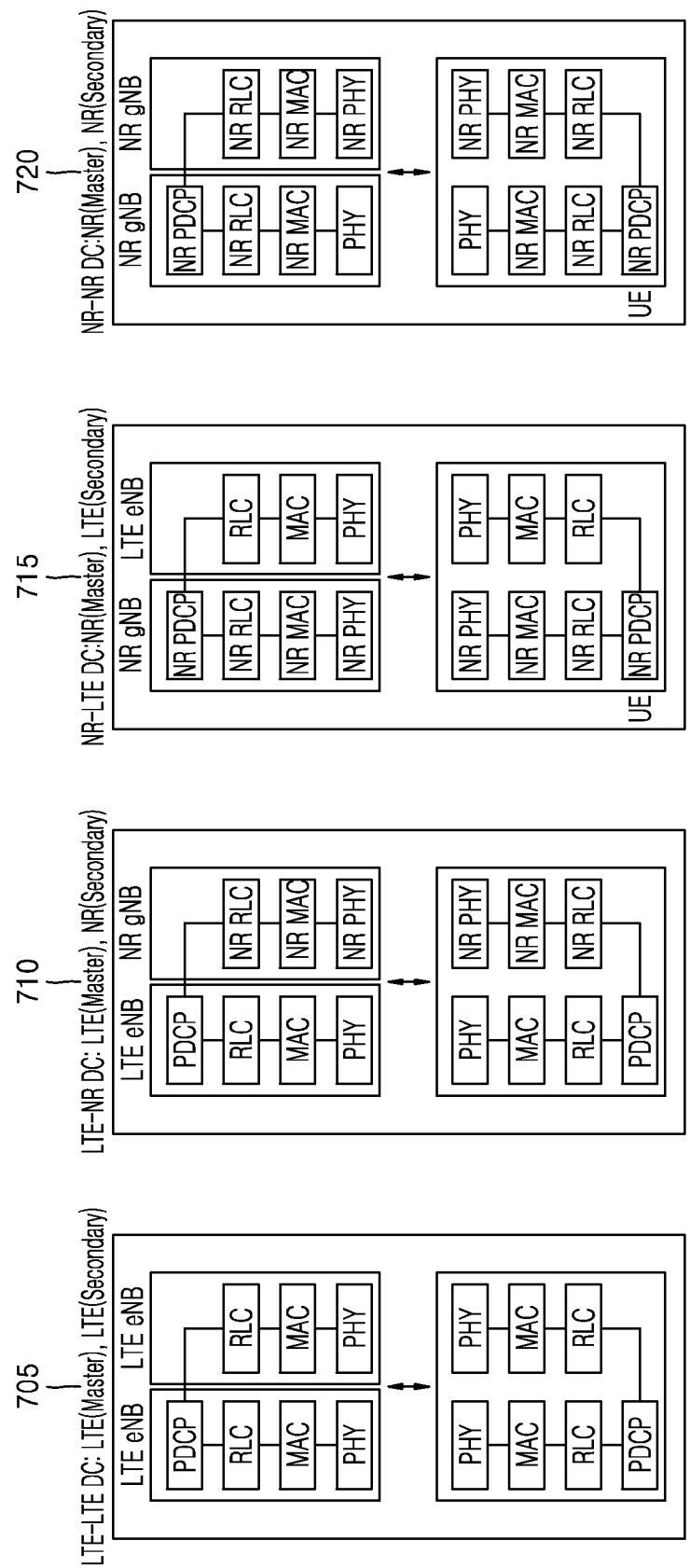
FIG. 7 illustrates a system to which a data transmission method of a dual access UE is applicable, according to an embodiment.

FIG. 7 illustrates a system to which a data transmission method of a dual access UE is applicable according to an embodiment.

As shown in FIG. 7, in dual access technology, a UE increases a data transmission rate in the downlink and uplink through a connection between a master cell group (MCG) base station and a secondary cell group (SCG) base station. The MCG base station may transmit and receive most of control signals and determine connection, change, and release of the SCG base station.

As shown in FIG. 7, the MCG base station may be an NR base station or an LTE base station. The SCG base station may also be the NR base station or the LTE base station. A data transmission method according to an embodiment may be applied to the following 4 dual access technology environments.

1. An LTE-LTE DC dual access environment 705 in which the LTE base station is the MCG base station and the LTE base station is the SCG base station;

2. An LTE-NR DC dual access environment 710 in which the LTE base station is the MCG base station and the NR base station is the SCG base station;

3. An NR-LTE DC dual access environment 715 in which the NR base station is the MCG base station and the LTE base station is the SCG base station;

4. An NR-NR DC dual access environment 720 in which the NR base station is the MCG base station and the NR base station is the SCG base station.

Figure 8:
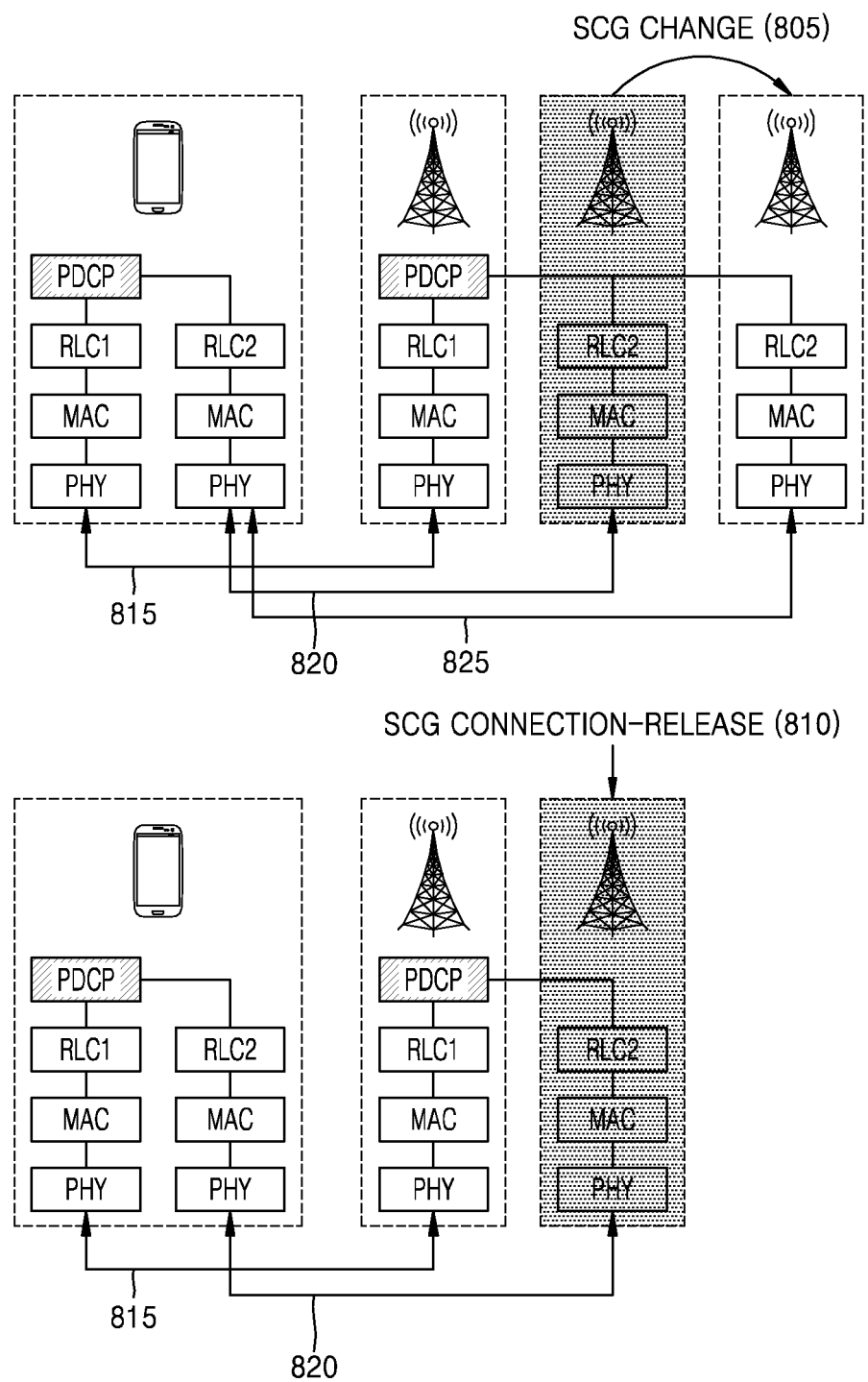
FIG. 8 illustrates a procedure in which a UE to which a dual access technology is applied receives a secondary cell group (SCG) change message or an SCG connection-release message, according to an embodiment.

FIG. 8 illustrates a procedure in which a UE to which a dual access technology is applied receives an SCG change message or an SCG connection-release message according to an embodiment.

In FIG. 8, when an SCG is changed (805), and the UE receives the SCG change message from an MCG base station, the UE may change a secondary cell indicated by the SCG change message to a new secondary cell. When the SCG is released (810), and the UE receives the SCG connection-release message from the MCG base station, the UE may release connection to a secondary cell indicated in the SCG connection-release message. The SCG change message and the SCG connection-release message are radio resource control (RRC) connection reconfiguration messages (RRC messages) and may be transmitted from the MCG base station to the UE.

When the UE receives the SCG change message or the SCG connection-release message, the UE may re-establish an RLC layer apparatus or a MAC layer apparatus, which corresponds to an SCG indicated in the RRC message, and perform a PDCP data recovery procedure.

A first embodiment of the PDCP data recovery procedure with respect to uplink data transmission of the UE when the UE receives the SCG change message or the SCG connection-release message according to an embodiment is as follows.

When the UE receives the SCG change message or the SCG connection-release message and thus receives, from an upper layer, a command to perform the PDCP data recovery procedure, the UE may re-establish the RLC layer apparatus or the MAC layer apparatus which corresponds to the SCG indicated in the RRC message, and may perform the PDCP data recovery procedure, as follows.

1. When a PDCP status report is received from a base station, the UE may discard data (PDCP PDU or PDCP SDU) of which successful delivery is acknowledged in the PDCP status report, and perform retransmission of data of which successful delivery is not acknowledged. The retransmission may be performed through a link that is currently set and is capable of transmitting and receiving data. For example, the retransmission may be selectively performed via any one of an MCG link 815 and a newly changed SCG link 825. In this regard, a link to be used for the retransmission may be determined according to the PDCP implementation.

2. When the PDCP status report is not received from the base station, the UE may retransmit, to the re-established RLC layer apparatus, the PDCP PDUs that have been transmitted. When the UE retransmits the PDCP PDUs, the UE may retransmit all PDCP PDUs sequentially starting from a first PDCP PDU of which successful delivery is not acknowledged from a lower layer. The retransmission may be performed through a link that is currently set and is capable of transmitting and receiving data, such as any one of the MCG link 815 and the newly changed SCG link 825. In this regard, a link to be used for the retransmission may be determined according to the PDCP implementation.

In the example of the first embodiment, it is assumed that the UE transmits PDCP PDUs corresponding to PDCP sequence numbers 0, 1, 2, and 3 to the uplink in the PDCP layer apparatus through the MCG link 815 and PDCP PDUs corresponding to PDCP sequence numbers 4, 5, 6, 7, 8, and 9 through the SCG link 820. It is assumed that the UE receives an RLC ACK corresponding to the PDCP sequence numbers 1 and 2 from the MCG link 815 and an RLC ACK corresponding to the PDCP sequence numbers 4, 6, 7, 8, and 9 from the SCG link 820.

When the UE receives the SCG change message or the SCG connection-release message from the base station, the UE may re-establish the RLC layer apparatus or the MAC layer apparatus which corresponds to the SCG indicated in the RRC message, and may perform the PDCP data recovery procedure, during which the UE may check whether the PDCP status report is included in the RRC message. When the PDCP status report is included in the RRC message, the UE may discard the data (PDCP PDU or PDCP SDU) of which successful delivery is acknowledged in the PDCP status report and perform retransmission of the data of which successful delivery is not acknowledged. Retransmission may be performed through a link that is currently set and is capable of transmitting and receiving data. For example, retransmission may be selectively performed via any one of the MCG link 815 and the newly changed SCG link 825. In this regard, the link to be used for retransmission may be determined according to the PDCP implementation.

When the PDCP status report is not included in the RRC message, the UE may re-establish the RLC layer apparatus or the MAC layer apparatus which corresponds to the SCG indicated in the RRC message, and perform the PDCP data recovery procedure. The UE may perform retransmission of the PDCP PDUs corresponding to the PDCP sequence numbers 4, 5, 6, 7, 8, and 9 transmitted to the re-established RLC layer apparatus. The UE may perform retransmission of all PDCP PDUs sequentially from the first PDCP PDU of which successful delivery is not acknowledged from the lower layer. That is, since the PDCP PDU corresponding to the PDCP sequence number 5 from the re-established RLC layer apparatus is the first PDCP PDU of which successful delivery (RLC ACK) is not acknowledged, the UE may perform retransmission of the PDCP PDUs corresponding to the PDCP sequence numbers 4, 5, 6, 7, 8, and 9 through a link that is currently set and is capable of transmitting and receiving data. For example, retransmission may be selectively performed via any one of the MCG link 815 and the newly changed SCG link 825. In this regard, the link to be used for retransmission may be determined according to the PDCP implementation.

Table 1 below illustrates PDCP PDUs delivered to each base station in the example of the first embodiment.

TABLE 1

| | PDCP SN | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| RLC1 | 0 | 0 | | | | | | | | | | | | | | |
| RLC2 | | | 0 | | | 0 | | 0 | 0 | 0 | 0 | | | | | |

A second embodiment of the PDCP data recovery procedure of the UE for reducing a data transmission delay with respect to the uplink data transmission when the UE receives the SCG change message or the SCG connection-release message according to an embodiment is as follows.

When the UE receives the SCG change message or the SCG connection-release message and thus, the UE receives, from an upper layer, a command to perform the PDCP data recovery procedure, the UE may re-establish the RLC layer apparatus or the MAC layer apparatus which corresponds to the SCG indicated in the RRC message, and may perform the following PDCP data recovery procedure.

1. When a PDCP status report is received from a base station, the UE may discard data (PDCP PDU or PDCP SDU) of which successful delivery is acknowledged in the PDCP status report and perform retransmission of data of which successful delivery is not acknowledged, through a link that is currently set and is capable of transmitting and receiving data. For example, the retransmission may be selectively performed via any one of the MCG link 815 and the newly changed SCG link 825. In this regard, a link to be used for the retransmission may be determined according to the PDCP implementation.

2. When the PDCP status report is not received from the base station, the UE may retransmit the PDCP PDUs that have been transmitted to the re-established RLC layer apparatus, by retransmitting all PDCP PDUs sequentially starting from a first PDCP PDU of which successful delivery is not acknowledged from a lower layer. The retransmission may be performed through a link that is currently set and is capable of transmitting and receiving data, such as any one of the MCG link 815 and the newly changed SCG link 825. In this regard, a link to be used for the retransmission may be determined according to the PDCP implementation.

In the example of the second embodiment, it is assumed that the UE transmits PDCP PDUs corresponding to PDCP sequence numbers 0, 1, 2, and 3 to the uplink in the PDCP layer apparatus through the MCG link 815 and PDCP PDUs corresponding to PDCP sequence numbers 4, 5, 6, 7, 8, and 9 through the SCG link 820, and that the UE receives an RLC ACK corresponding to the PDCP sequence numbers 1 and 2 from the MCG link 815 and an RLC ACK corresponding to the PDCP sequence numbers 4, 6, 7, 8, and 9 from the SCG link 820.

When the UE receives the SCG change message or the SCG connection-release message from the base station, the UE may re-establish the RLC layer apparatus or the MAC layer apparatus which corresponds to the SCG indicated in the RRC message, perform the PDCP data recovery procedure, and check whether the PDCP status report is included in the RRC message.

The UE may discard the data (PDCP PDU or PDCP SDU) of which successful delivery is acknowledged in the PDCP status report and perform retransmission of the data of which successful delivery is not acknowledged, through a link that is currently set and is capable of transmitting and receiving data. For example, retransmission may be selectively performed via any one of the MCG link 815 and the newly changed SCG link 825. In this regard, the link to be used for retransmission may be determined according to the PDCP implementation. When the PDCP status report is not included in the RRC message, the UE may re-establish the RLC layer apparatus or the MAC layer apparatus which corresponds to the SCG indicated in the RRC message, and perform the PDCP data recovery procedure. The UE may perform retransmission of the PDCP PDUs corresponding to the PDCP sequence numbers 4, 5, 6, 7, 8, and 9 transmitted to the re-established RLC layer apparatus. When the UE performs retransmission, the UE may perform retransmission of all PDCP PDUs sequentially from the first PDCP PDU of which successful delivery is not acknowledged from the lower layer. That is, because the PDCP PDU corresponding to the PDCP sequence number 5 from the re-established RLC layer apparatus is the first PDCP PDU of which successful delivery (RLC ACK) is not acknowledged, the UE may perform retransmission of the PDCP PDU corresponding to the PDCP sequence number 5. At this time, retransmission may be performed through a link that is currently set and is capable of transmitting and receiving data, such as any one of the MCG link 815 and the newly changed SCG link 825. In this regard, the link to be used for retransmission may be determined according to the PDCP implementation.

In the above example, loss may not occur even when selective retransmission is performed. In view of a reception end, a receiving RLC layer apparatus has successfully received the PDCP PDUs corresponding to the PDCP sequence numbers 4, 6, 7, 8, and 9, and therefore instructs the successful delivery (RLC ACK) when sending the RLC status report to a transmission end.

When the receiving RLC layer apparatus is an LTE RLC layer apparatus, because the LTE RLC layer apparatus sequentially delivers the PDCP PDUs to the upper layer, the LTE RLC layer apparatus may not deliver data corresponding to the PDCP sequence numbers 6, 7, 8, and 9 to a PDCP layer. However, when the SCG is changed or connection-released, the receiving RLC layer apparatus may be re-established, and in this regard, the RLC layer apparatus may remove the RLC header from the data corresponding to the PDCP sequence numbers 6, 7, 8 and 9 which are not sequential, process the data, and then deliver the data to the PDCP layer. Therefore, the receiving RLC layer apparatus has the PDCP PDUs for which the successful delivery has been instructed by using RLC ACK, thereby reducing unnecessary retransmission. That is, the UE does not need to retransmit all the PDCP PDUs from the first PDCP PDUs of which successful delivery is not acknowledged, and may perform selective retransmission of only PDCP PDUs of which successful delivery is not acknowledged with respect to RLC ACK.

When the receiving RLC layer apparatus is an NR RLC layer apparatus, since the NR RLC layer apparatus does not have an order delivery function of sequentially delivering data to the upper layer and performs an out-of-order delivery function, data for which successful delivery has been instructed by using RLC ACK in the RLC status report may be immediately delivered to the PDCP layer. Therefore, the RLC layer apparatus may remove the RLC header from the data corresponding to the PDCP sequence numbers 6, 7, 8 and 9 and process the data, and then deliver the data to the PDCP layer. Therefore, the receiving RLC layer apparatus has the PDCP PDUs for which the successful delivery has been instructed by using RLC ACK, and the UE does not perform unnecessary retransmission.

Consequently, when selective retransmission is performed based on the successful delivery (RLC ACK) of the RLC layer apparatus disclosed above, unnecessary retransmission and corresponding data transmission delay may be reduced.

A third embodiment in which a data transmission delay is reduced when a UE receives the SCG change message or the SCG connection-release message according to the embodiment is as follows.

When the UE receives the SCG change message or the SCG connection-release message, and thus, the UE receives, from an upper layer, a command to perform the PDCP data recovery procedure, the UE may re-establish the RLC layer apparatus or the MAC layer apparatus which corresponds to the SCG indicated in the RRC message, and perform the PDCP data recovery procedure. In the following third embodiment, when the base station sends the SCG change message or the SCG connection-release message, the base station may always include the PDCP status report to instruct PDCP sequence numbers of data that a PDCP layer apparatus successfully received and did not successfully receive. Accordingly, when the UE receives the SCG change message or the SCG connection-release message, the UE may always receive the PDCP status report and perform selective retransmission, such that unnecessary retransmission and corresponding transmission delay of new data may be reduced.

Figure 9:
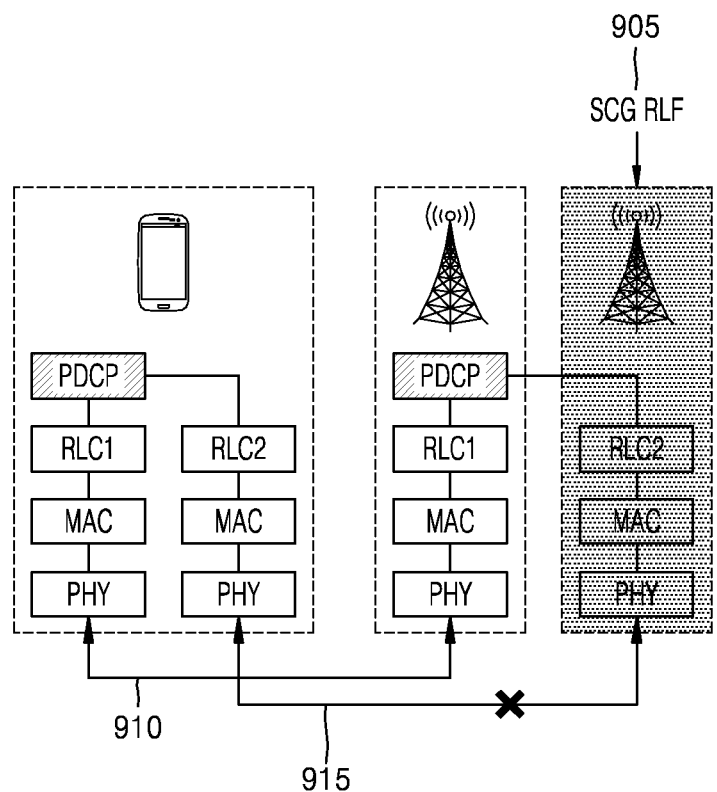
FIG. 9 illustrates a procedure in which a UE detects a radio link failure (RLF) in an SCG and declares the RLF, according to an embodiment.

FIG. 9 illustrates a procedure in which an UE detects and declares a radio link failure (RLF) in an SCG according to an embodiment.

In FIG. 9, the dual-accessed UE may declare the RLF when the intensity of signal is constantly low in an SCG link 915 during data transmission/reception between an MCG link 910 and the SCG link 915. The UE may declare the RLF when the maximum number of retransmissions is exceeded in an RLC layer apparatus. However, this is merely an example in which the UE declares the RLF, and the present disclosure is not limited to the above-described example.

When the UE determines the RLF with respect to the SCG (905), the UE needs to report a base station at which the RLF occurs with respect to the SCG. The UE may report the SCG RLF through the MCG link 910 and may stop data transmission with respect to the SCG and stand by until the base station instructs an SCG change message or an SCG connection-release message.

Therefore, in the above procedure, while the UE waits for an instruction (SCG change or connection-release) from the base station, retransmission of data lost in the SCG link 915 may not be performed. Therefore, a receiving PDCP layer apparatus may wait for the lost data for a predetermined time period (for example, for a value of an order reordering timer), which may cause the data transmission delay.

The first, second, or third embodiment for reducing the transmission delay caused when the UE receives the SCG change message or the SCG connection-release message may be more applicable to, in particular, a split bearer set to the UE configured to support a dual access environment, and may also be applied to when the UE receives a logical channel release message or a logical channel change message or a logical channel add message.

In the embodiments described above, the SCG change message and the SCG release message may instruct an operation of changing or releasing all bearers and logical channels set in the SCG. However, the logical channel release message or the logical channel change message or the logical channel add message may release or change or add at least one of some logical channels, RLC layer apparatuses and MAC layer apparatuses of an MCG or the SCG. For example, when three split bearers are set in the UE, that is, split bearer 1, split bearer 2, and split bearer 3 are set over the MCG and the SCG, a base station may transmit the logical channel release message to the UE and release at least one of a logical channel, an RLC layer apparatus, and a MAC layer apparatus corresponding to an SCG of the split bearer 2, and change the released one to a data wireless bearer (DRB). A logical channel may be changed or added to a specific split bearer or DRB through the logical channel change message or the logical channel add message. In the above example, when the SCG release message is transmitted to the UE, connections of all three split bearers may be released. Accordingly, the base station may usefully instruct the UE with a more specific command through the logical channel release message, the logical channel change message, or the logical channel add message, so as to change a bearer type for each bearer of the UE. That is, the logical channel release message, the logical channel change message or the logical channel add message may be used to change the DRB to the split bearer or the split bearer to the DRB.

When the UE receives the logical channel release message, the logical channel change message, or the logical channel add message, and the message instructs to release or change or add at least one of a logical channel, an RLC layer apparatus and a MAC layer apparatus corresponding to the SCG of the split bearer (or the DRB), the first embodiment, the second embodiment or the third embodiment for reducing the transmission delay may be equally applied thereto.

The UE according to a fourth embodiment may perform the PDCP data recovery procedure of reducing the data transmission delay when the UE detects an RLF in an SCG link in uplink data transmission.

When the UE detects the RLF in the SCG link, the UE may report an SCG RLF with respect to the link to the base station via an MCG link, stop data transmission corresponding to the SCG, and immediately perform a next PDCP data recovery procedure.

The UE may perform retransmission of PDCP PDUs that have been transmitted to an RLC layer apparatus from which the RLF is detected. When the UE performs retransmission, the UE may perform selective retransmission on only data (PDCP PDU or PDCP SDU) of which successful delivery (RLC ACK) is not acknowledged in a lower layer, and retransmission may be performed through the MCG link 910 that is currently set and is capable of transmitting and receiving data.

When the UE receives the SCG change message or the SCG release message from the base station, the UE may re-establish the RLC layer apparatus or the MAC layer apparatus which corresponds to the SCG instructed in the RRC message. The PDCP data recovery procedure is not performed again since the PDCP data recovery procedure has already been performed.

The above-described example is a method that may be applied to when the UE detects the RLF in the SCG link, and may reduce data transmission delay. After the UE reports the SCG RLF, the UE may receive one command of the SCG change message and the SCG release message from the base station, and is required to perform the PDCP data recovery procedure. Therefore, when the RLF is detected, the UE may perform the PDCP data recovery procedure immediately, such that the data transmission delay may be reduced.

The fourth embodiment described above corresponds to a procedure performed when the UE detects the RLF in the SCG link, and the first embodiment, the second embodiment, or the third embodiment described above may be applied to when the UE does not detect the RLF in the SCG link but receives the SCG change message or the SCG release message, An example of the fourth embodiment is as follows.

It is assumed that the UE transmits PDCP PDUs corresponding to PDCP sequence numbers 0, 1, 2, and 3 to the uplink in the PDCP layer apparatus through the MCG link 910 and PDCP PDUs corresponding to PDCP sequence numbers 4, 5, 6, 7, 8, and 9 through SCG link 915. Also, it is assumed that the UE receives an RLC ACK corresponding to the PDCP sequence numbers 1 and 2 from the MCG link 910 and RLC ACK corresponding to the PDCP sequence numbers 4, 6, 7, 8, and 9 from the SCG link 915.

When the UE receives the RLF with respect to the SCG link 915, the UE may report the RLF with respect to the SCG link 915 via the MCG link 910, wait for an instruction from the base station, and perform the PDCP data recovery procedure. The UE may perform retransmission of the PDCP PDUs corresponding to the PDCP sequence numbers 4, 5, 6, 7, 8, and 9 that have been transmitted to an RLC layer apparatus corresponding to the SCG link 915 from which the RLF is detected, by performing retransmission of all PDCP PDUs sequentially from the first PDCP PDU of which successful delivery (RLC ACK) is not acknowledged from the lower layer. That is, because the PDCP PDU corresponding to the PDCP sequence number 5 from the RLC layer apparatus corresponding to the SCG link 915 from which the RLF is detected is the first PDCP PDU of which successful delivery (RLC ACK) is not acknowledged, the UE may perform retransmission of the PDCP PDU corresponding to the PDCP sequence number 5, through MCG link 910 that is currently set and is capable of transmitting and receiving data.

In the above example, loss may not occur even when selective retransmission is performed. In view of a reception end, a receiving RLC layer apparatus has successfully received the PDCP PDUs corresponding to the PDCP sequence numbers 4, 6, 7, 8, and 9, and therefore, instructs the successful delivery (RLC ACK) when sending the RLC status report to a transmission end. When the receiving RLC layer apparatus is an LTE RLC layer apparatus, the LTE RLC layer apparatus delivers the PDCP PDUs that are sequentially received to the upper layer, and does not deliver data corresponding to the PDCP sequence numbers 6, 7, 8, and 9 to a PDCP layer. However, when the SCG is changed or connection to the SCG is released, the receiving RLC layer apparatus may be re-established, and the RLC layer apparatus may remove the RLC header from the data corresponding to the PDCP sequence numbers 6, 7, 8 and 9 which are not sequential and process the data, and then deliver the data to the PDCP layer. Because the receiving RLC layer apparatus has the PDCP PDUs for which the successful delivery has been instructed by using RLC ACK, the UE does not need to perform unnecessary retransmission. That is, the UE does not need to retransmit all the PDCP PDUs from the first PDCP PDUs of which successful delivery is not acknowledged, and may perform selective retransmission of only PDCP PDUs of which successful delivery is not acknowledged with respect to the RLC ACK.

When the receiving RLC layer apparatus is an NR RLC layer apparatus, since the NR RLC layer apparatus does not have an order delivery function of sequentially delivering data to the upper layer and performs an out-of-order delivery function, data for which successful delivery has been instructed by using an RLC ACK in the RLC status report may be immediately delivered to the PDCP layer. Therefore, the RLC layer apparatus may remove the RLC header from the data corresponding to the PDCP sequence numbers 6, 7, 8 and 9, process the data, and then deliver the data to the PDCP layer. Therefore, the receiving RLC layer apparatus has the PDCP PDUs for which the successful delivery has been instructed by using RLC ACK, and the UE does not need to perform unnecessary retransmission.

Consequently, unnecessary retransmission may be reduced when selective retransmission is performed based on the successful delivery (RLC ACK) of the RLC layer apparatus according to an embodiment, and the data transmission delay may be reduced since the PDCP data recovery procedure may be performed as soon as the RLF is detected.

A fifth embodiment of the PDCP data restoration procedure for reducing the data transmission delay when the UE detects the RLF in the SCG link during the uplink data transmission is as follows. When the UE detects the RLF in the SCG link, the UE may report the SCG RLF with respect to the link to the base station via the MCG link, and may stop data transmission corresponding to the SCG and immediately perform a next PDCP data recovery procedure.

The UE may perform retransmission of the PDCP PDUs that have been transmitted to the RLC layer apparatus from which the RLF is detected, by performing retransmission of all PDCP PDUs sequentially from the first PDCP PDU of which successful delivery (RLC ACK) is not acknowledged from the lower layer. The retransmission may be performed through MCG link 910 that is currently set and is capable of transmitting and receiving data.

When the UE receives the SCG change message or the SCG release message from the base station, the UE may re-establish the RLC layer apparatus or the MAC layer apparatus which corresponds to the SCG instructed in the RRC message. The PDCP data recovery procedure is not performed again since the PDCP data recovery procedure has already been performed.

The fifth embodiment may be applied to when the UE detects the RLF in the SCG link, and may reduce data transmission delay d. After the UE reports the SCG RLF, the UE may receive one command of the SCG change message and the SCG release message from the base station, and is required to perform the PDCP data recovery procedure. Therefore, when the RLF with respect to the SCG link is detected, the UE may immediately perform the PDCP data recovery procedure that is required to be performed, such that the data transmission delay may be reduced.

The fifth embodiment described above corresponds to a procedure performed when the UE detects the RLF in the SCG link, as does the fourth embodiment, and the first embodiment, the second embodiment, and the third embodiment described above may be applied to when the UE does not detect the RLF in the SCG link but receives the SCG change message or the SCG release message.

Figure 10:
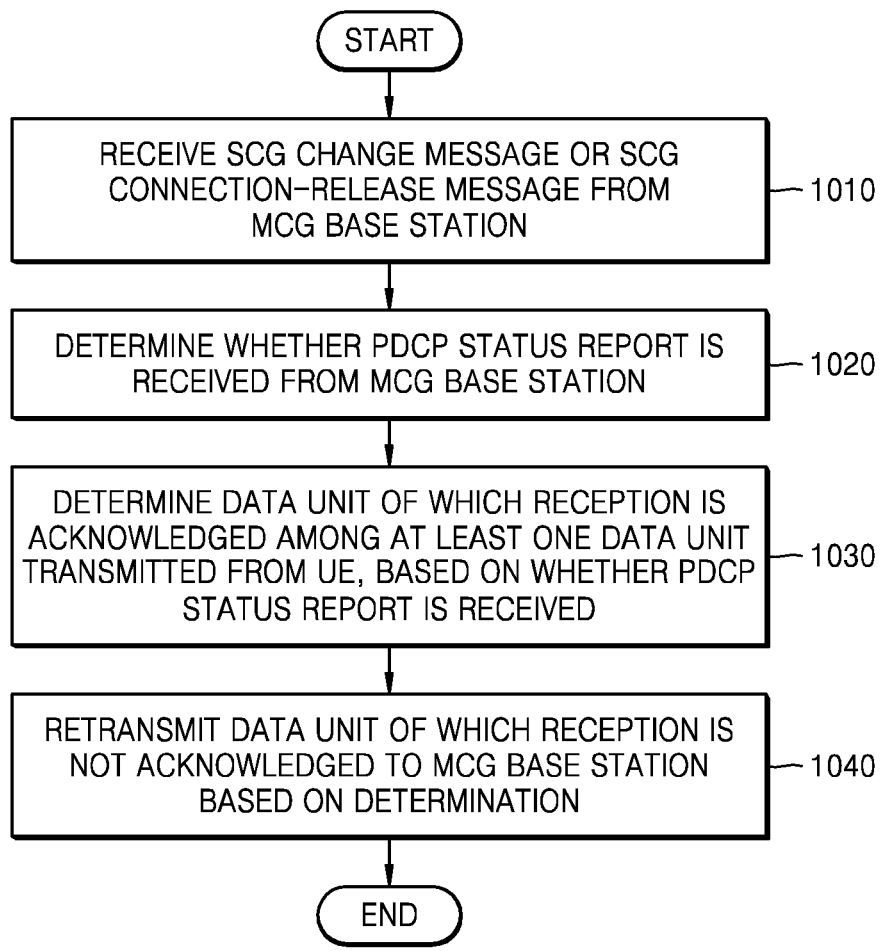
FIG. 10 illustrates a method of transmitting data when a UE receives an SCG change message or an SCG release message, according to an embodiment.

FIG. 10 illustrates a method of transmitting data when a UE receives an SCG change message or an SCG release message according to an embodiment.

In step 1010, the UE may receive an SCG change message or an SCG connection-release message from a MCG base station. In the present embodiment, it is assumed that the UE is dually accessed to the MCG base station and an SCG base station and supports a bearer split configuration.

In step 1020, the UE may determine whether a PDCP status report is received from the MCG base station. The UE may acknowledge data units received by the base station according to the PDCP status report, and the data unit may be a PDCP PDU.

In step 1030, the UE may determine a data unit of which reception is acknowledged among at least one data unit transmitted from the UE, based on whether the PDCP status report is received.

When the PDCP status report is received, the UE may determine the data unit of which reception is acknowledged according to the PDCP status report. According to another example, when the PDCP status report is not received, the UE may determine a data unit of which reception is acknowledged from a lower layer.

Figure 11:
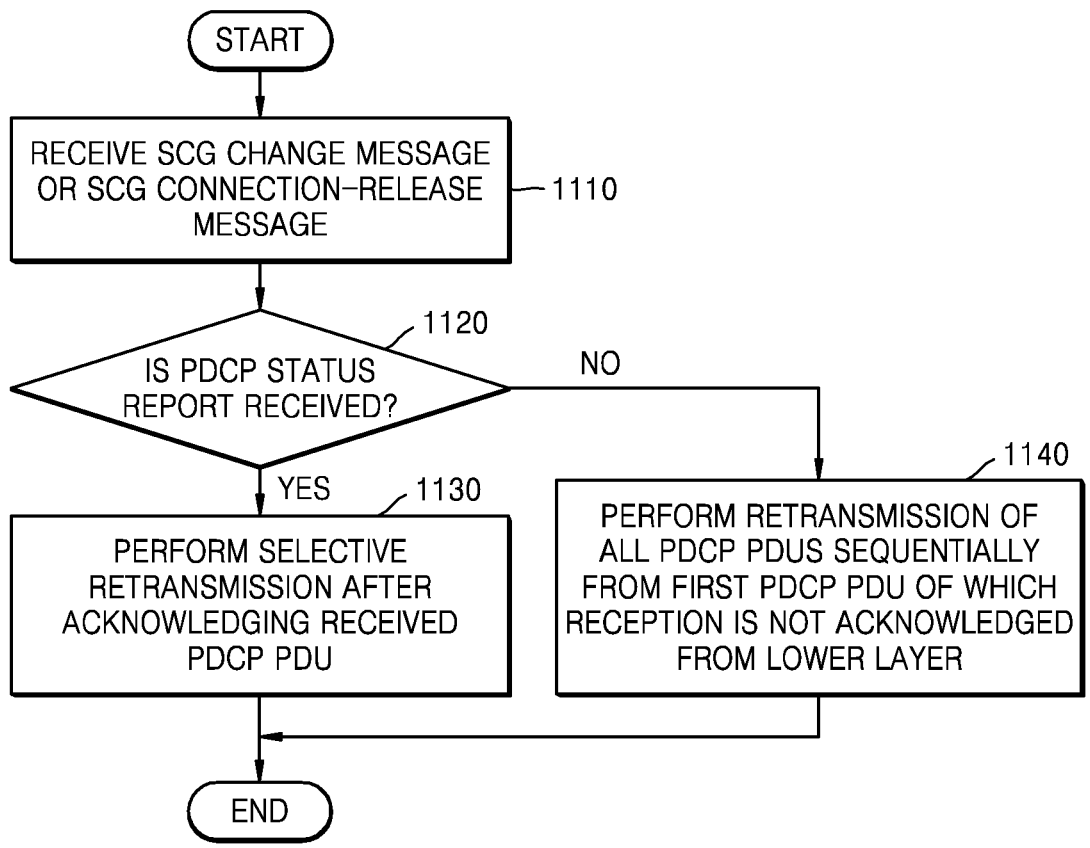
FIG. 11 illustrates a data transmission method of a UE, according to a first embodiment.

In step 1040, the UE may selectively retransmit a data unit of which reception is not acknowledged to the MCG base station, based on the determination. FIG. 11 illustrates a data transmission method of a UE according to a first embodiment.

In step 1110, the UE may receive an SCG change message or an SCG connection-release message. When the UE receives the SCG change message or the SCG connection-release message, the UE may re-establish an RLC layer apparatus or a MAC layer apparatus which corresponds to an SCG instructed in an RRC message, and initiate a PDCP data recovery procedure.

In step 1120, the UE may determine whether a PDCP status report is received.

In step 1130, when the PDCP status report is received from the MCG base station, the UE may discard data (PDCP PDU or PDCP SDU) of which reception is acknowledged in the PDCP status report and perform retransmission only on data of which reception is not acknowledged. The retransmission may be performed through a link that is currently set and is capable of transmitting and receiving data, such as an MCG link or a newly changed SCG link, and in this regard, a link to be used for the retransmission may be determined according to the PDCP implementation.

In step 1140, when the PDCP status report is not received from the MCG base station, the UE may perform retransmission of the PDCP PDUs that have been transmitted, to the re-established RLC apparatus. When the UE performs the retransmission, the UE may perform the retransmission of all PDCP PDUs sequentially from a first PDCP PDU of which reception is not acknowledged from a lower layer. The retransmission may be performed through a link that is currently set and is capable of transmitting and receiving data, such as the MCG link or the newly changed SCG link. In this regard, a link to be used for the retransmission may be determined according to the PDCP implementation.

Figure 12:
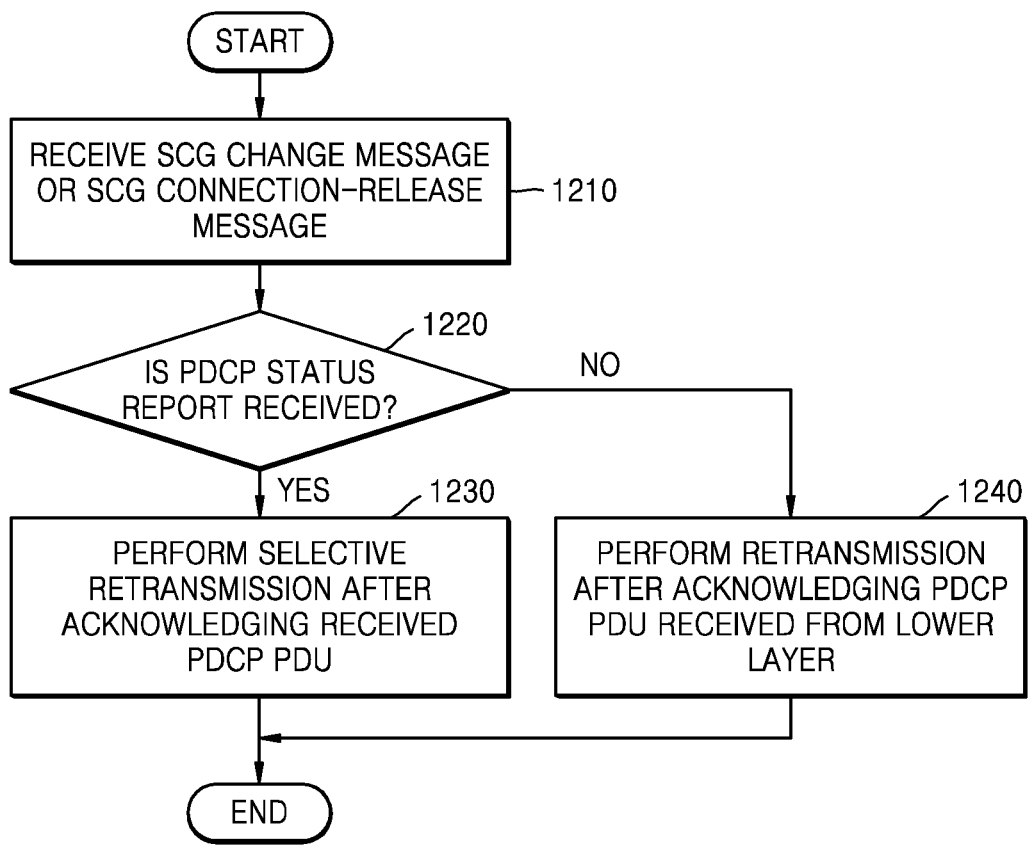
FIG. 12 illustrates a data transmission method of a UE, according to a second embodiment.

FIG. 12 illustrates a data transmission method of a UE according to a second embodiment.

In step 1210, the UE may receive an SCG change message or an SCG connection-release message, may re-establish an RLC layer apparatus or a MAC layer apparatus which corresponds to an SCG instructed in an RRC message, and may perform a PDCP data recovery procedure.

In step 1220, the UE may determine whether a PDCP status report is received from a base station.

In step 1230, when the PDCP status report is received, the UE may perform selective retransmission after the UE acknowledges received PDCP PDU through the PDCP status report. In more detail, the UE may discard data (PDCP PDU or PDCP SDU) of which reception is acknowledged and perform retransmission of only data of which reception is not acknowledged through a link that is currently set and is capable of transmitting and receiving data, such as an MCG link or a newly changed SCG link. In this regard, a link to be used for the retransmission may be determined according to the PDCP implementation.

In step 1240, when the PDCP status report is not received, the UE may perform selective retransmission after the UE acknowledges PDCP PDU received from a lower layer. The UE may perform retransmission of PDCP PDUs that have been transmitted, to the re-established RLC layer apparatus.

When the UE performs the retransmission, the UE may perform selective retransmission of only the data (PDCP PDU or PDCP SDU) of which reception is not acknowledged in the lower layer, through a link that is currently set and is capable of transmitting and receiving data. For example, the UE may retransmit data via the MCG link or the newly changed SCG link. In this regard, a link to be used for the retransmission may be determined according to the PDCP implementation.

Figure 13:
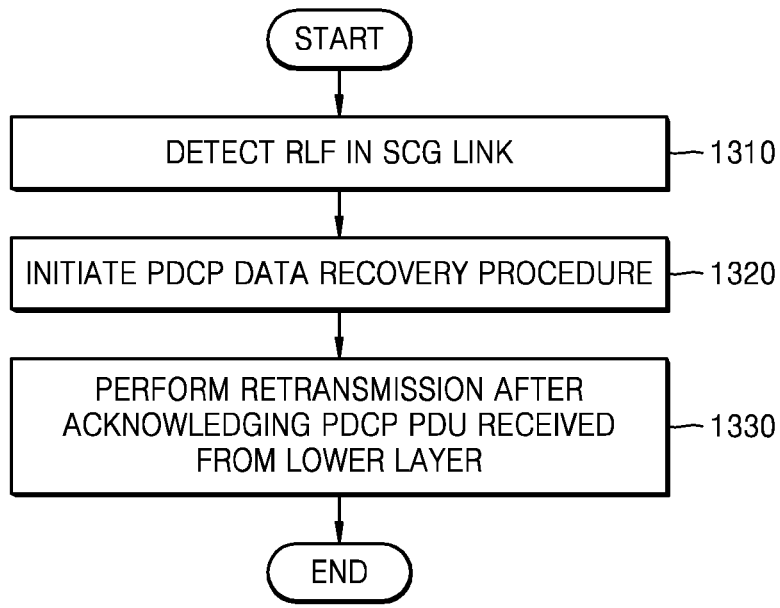
FIG. 13 illustrates a method of selectively retransmitting data when a UE detects an RLF, according to an embodiment.

FIG. 13 illustrates a method of selectively retransmitting data when a UE detects an RLF according to an embodiment.

In step 1310, the UE may detect the RLF in an SCG link, and may report the SCG RLF with respect to the SCG link to a base station via an MCG link. The UE may stop transmission of data corresponding to an SCG.

In step 1320, the UE may initiate a PDCP data recovery procedure. The UE may perform retransmission of PDCP PDUs that have been transmitted through an RLC layer apparatus from which the RLF is detected.

In step 1330, when the UE performs the retransmission according to initiation of the recovery procedure, the UE may perform selective retransmission after the UE acknowledges PDCP PDUs received in a lower layer. In more detail, the UE may perform selective retransmission of only data (PDCP PDU or PDCP SDU) of which reception is not acknowledged, through a link that is currently set and is capable of transmitting and receiving data, such as the MCG link.

When the UE receives an SCG change message or a SCG connection-release message from the base station, the UE may re-establish an RLC layer apparatus or a MAC layer apparatus which corresponds to the SCG instructed in an RRC message. The PDCP data recovery procedure is not performed again since the PDCP data recovery procedure has already been performed.

Figure 14:
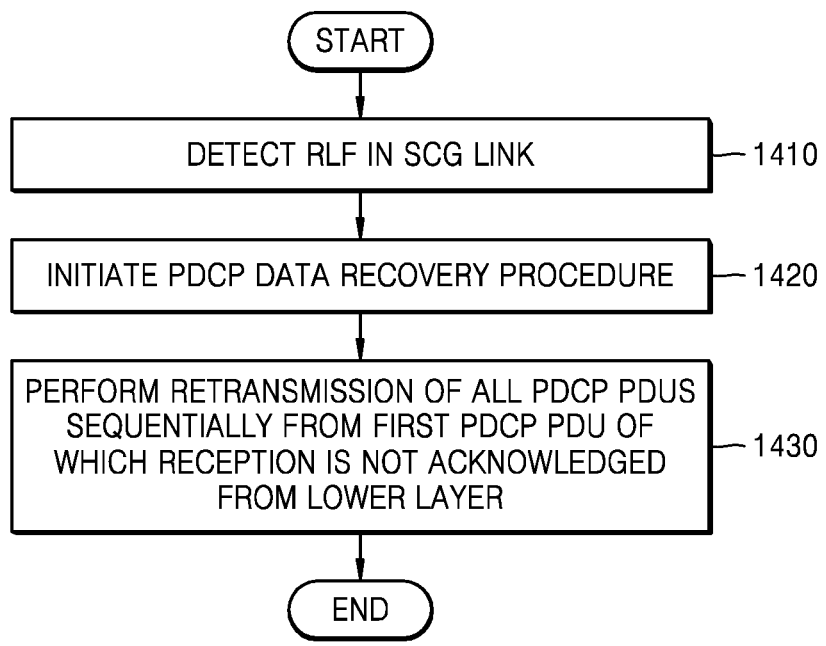
FIG. 14 illustrates a method, performed by a UE, of sequentially retransmitting data of which reception is not acknowledged when an RLF is detected, according to an embodiment.

FIG. 14 illustrates a method, performed by a UE, of sequentially retransmitting data of which reception is not acknowledged when an RLF is detected according to an embodiment.

In step 1410, the UE may detect the RLF in an SCG link, and may report the SCG RLF with respect to the SCG link to a base station via an MCG link. The UE may stop transmission of data corresponding to a SCG.

In step 1420, the UE may initiate a PDCP data recovery procedure.

In step 1430, the UE may perform retransmission of all PDUs sequentially from a first PDU of which reception is not acknowledged from a lower layer. The UE may start the retransmission of the PDCP PDUs that have been transmitted to an RLC layer apparatus from which the RLF is detected. The UE may perform the retransmission of all the PDCP PDUs sequentially from the first PDCP PDUs of which reception is not acknowledged in the lower layer, through a link that is currently set and is capable of transmitting and receiving data, such as through the MCG link.

When the UE receives an SCG change message or an SCG connection-release message from the base station, the UE may re-establish an RLC layer apparatus or a MAC layer apparatus which corresponds to the SCG instructed in the RRC message. The PDCP data recovery procedure is not performed again since the PDCP data recovery procedure has already been performed.

According to an embodiment, when the base station triggers the PDCP data recovery procedure, the UE may perform selective retransmission on data bearers that use an AM mode based on a successful delivery acknowledgment (RLC ACK) of lower layer apparatuses (RLC layer apparatuses) when a PDCP layer apparatus performs the PDCP data recovery procedure. However, when the UE performs handover to another cell in one base station, the UE may perform selective retransmission on signaling wireless bearers (SRBs) in a same manner as the above-described method and proceed with the data recovery procedure to prevent data loss.

The base station may also define a new indicator to indicate whether to perform the PDCP data recovery procedure on the SRB. That is, the PDCP data recovery procedure through the selective retransmission may be extended and applied to the SRB. When the UE performs handover to another cell in one base station as described above, and when the PDCP data recovery procedure is triggered, the UE may not perform retransmission on bearers that use an UM mode but may perform data transmission on data that is not yet transmitted from the PDCP layer apparatus (data that is not yet delivered to the lower layer) as if the data is received from an upper layer.

The selective retransmission method according to the embodiment may be applied to a PDCP re-establishment procedure. However, in the case of handover, the PDCP re-establishment procedure triggered by the base station may cause data loss when selective retransmission is always used, since it is not mandatory for a PDCP layer apparatus of a source base station to deliver all successfully received data to a PDCP layer apparatus of a target base station. Therefore, even when the UE receives, from the source base station, a report that the data is successfully received, it is necessary to retransmit, to the target base station, data of which successful delivery is acknowledged by using an RLC ACK. That is, the UE may perform accumulated retransmission by which data corresponding to a first PDCP sequence number of which successful delivery is not acknowledged is sequentially retransmitted during the PDCP re-establishment procedure. Therefore, retransmission may be performed even when there is data of which successful delivery is acknowledged (receiving RLC ACK) by the lower layer among data having a sequence number greater than the first PDCP sequence number of which successful delivery is not acknowledged.

However, when the PDCP layer apparatus of the source base station delivers all the successfully received data to the PDCP layer apparatus of the target base station, the UE may perform the selective retransmission method according to the embodiment to prevent unnecessary retransmission and waste of transmission resources. Thus, by defining the new indicator, the base station may indicate whether to perform selective retransmission or accumulated retransmission to the UE when the UE performs the PDCP re-establishment procedure. For example, the selective retransmission may be performed when there is the indicator, and the accumulated retransmission may be performed when there is no indicator.

According to another example, when a 1-bit indicator is defined as the indicator and indicates a value "True", the selective retransmission may be performed, and when the 1-bit indicator indicates a value "False", the accumulated retransmission may be performed. The indicator may also be defined in the RRC message, may be indicated in PDCP configuration information, and may be indicated via a handover indication message or an RRC reset message.

Figure 15:
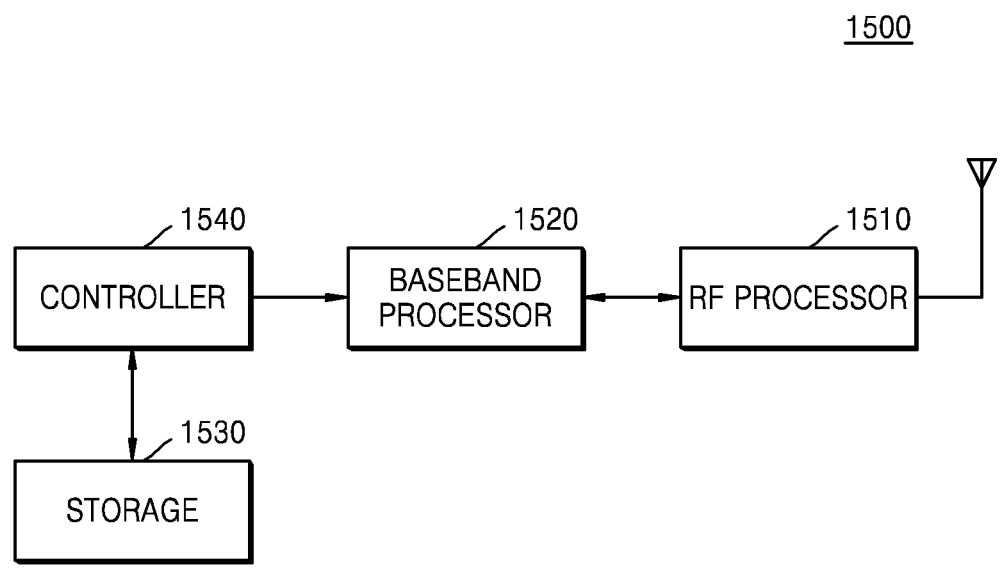
FIG. 15 is a block diagram of a UE according to an embodiment.

FIG. 15 is a block diagram of a UE 1500 according to an embodiment.

Referring to FIG. 15, the UE 1500 may include a radio frequency (RF) processor 1510, a baseband processor 1520, a storage 1530, and a controller 1540. However, components of FIG. 15 are only an example, and the present disclosure is not limited thereto.

The RF processor 1510 may perform transmission and reception of a signal through a wireless channel by converting a band of the signal or amplifying the signal, for example. That is, the RF processor 1510 may up-convert a baseband signal provided from the baseband processor 1520 to an RF band signal, transmit the RF band signal through an antenna, and down-convert an RF band signal received through the antenna to a baseband signal. For example, the RF processor 1510 may include a transmission filter, a reception filter, an amplifier, a mixer, an oscillator, a digital-to-analog converter (DAC), and an analog-to-digital converter (ADC). While only one antenna is shown in FIG. 15, the UE 1500 may have a plurality of antennas.

The RF processor 1510 may include a plurality of RF chains and may perform beamforming by adjusting a phase and magnitude of each of signals transmitted and received via the plurality of antennas or antenna elements. The RF processor 1510 may perform a MIMO operation and may receive a plurality of layers when performing the MIMO operation. The RF processor 1510 may perform reception beam sweeping by appropriately setting the plurality of antennas or the antenna elements by the control of the controller 1540, or adjust a direction and width of a received beam such that the received beam coordinates with a transmitted beam.

The baseband processor 1520 may perform conversion between the baseband signal and a bit string according to a physical layer specification of the system. For example, upon transmitting data, the baseband processor 1520 may generate complex symbols by encoding and modulating transmitted bit strings. Upon receiving data, the baseband processor 1520 may demodulate and decode a baseband signal provided from the RF processor 1510 to reconstruct received bit strings. For example, when data is transmitted according to an OFDM scheme, the baseband processor 1520 may generate complex symbols by encoding and modulating transmitted bit strings, map the complex symbols to subcarriers, and configure OFDM symbols by performing an inverse fast Fourier transform (IFFT) operation and inserting a cyclic prefix (CP).

Upon receiving data, the baseband processor 1520 may split the baseband signal provided from the RF processor 1510 into OFDM symbol units and restore the signals mapped to the subcarriers by performing a fast Fourier transform (FFT) operation and then reconstruct the received bit strings by performing demodulation and decoding.

The baseband processor 1520 and the RF processor 1510 may transmit and receive signals as described above. Accordingly, the baseband processor 1520 and the RF processor 1510 may be referred to as a transmitter, a receiver, a transmitter/receiver, or a communicator. At least one of the baseband processor 1520 and the RF processor 1510 may include a plurality of communication modules to support different wireless access technologies, and may include different communication modules configured to process signals of different frequency bands. For example, the different wireless access technologies may include an LTE network or an NR network, and may include a super high frequency (SHF) band (e.g., 2.5 GHz or 5 GHz), and a millimeter wave (e.g., 60 GHz) band.

The storage 1530 may store data such as a default program, an application program, and configuration information for the operations of the UE 1500 described above with reference to FIGS. 1 to 14. The storage 1530 may provide the stored data in response to a request from the controller 1540.

The controller 1540 may control overall operations of the UE 1500. For example, the controller 1540 may transmit and receive signals through the baseband processor 1520 and the RF processor 1510, and may record and read the data stored in the storage 1530. To do so, the controller 1540 may include at least one processor. For example, the controller 1540 may include a communication processor (CP) configured to perform communication control and an application processor (AP) configured to control an upper layer such as an application program.

Figure 16:
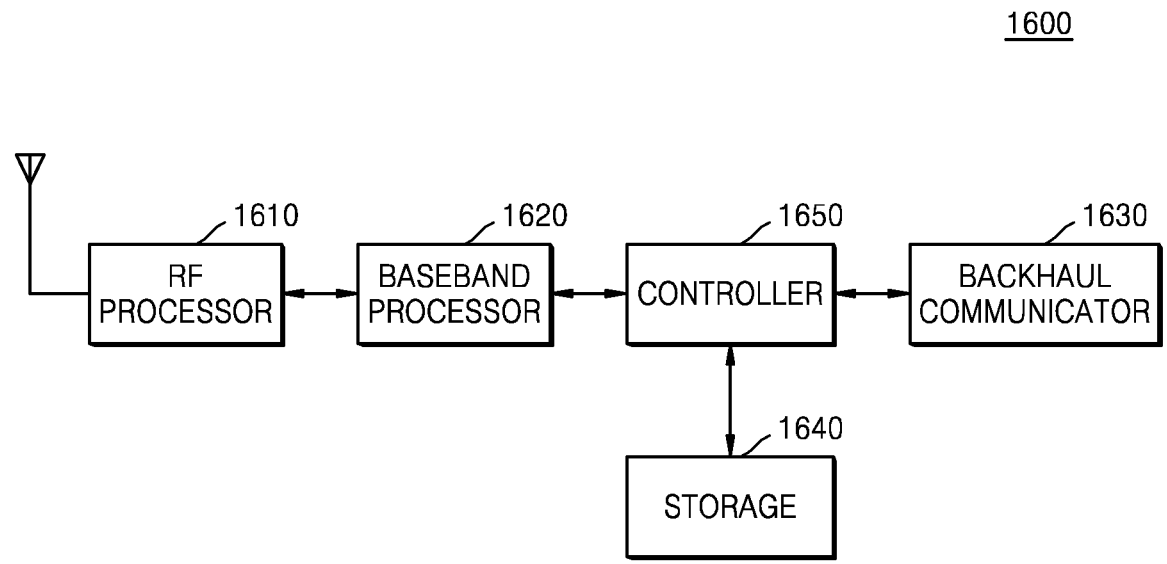
FIG. 16 is a block diagram of a base station according to an embodiment.

FIG. 16 is a block diagram of a base station 1600 according to an embodiment.

Referring to FIG. 16, the base station 1600 may include an RF processor 1610, a baseband processor 1620, a backhaul communicator 1630, a storage (i.e., memory) 1640, and a controller 1650. However, components of FIG. 16 are only an example, and, components of the base station 1600 are not limited to the above-described example.

The RF processor 1610 may perform transmission and reception of a signal through a wireless channel by converting a band of the signal or amplifying the signal, for example. The RF processor 1610 may up-convert a baseband signal provided from the baseband processor 1620 to an RF band signal, transmit the RF band signal through an antenna, and down-convert a RF band signal received through the antenna to a baseband signal. For example, the RF processor 1610 may include a transmission filter, a reception filter, an amplifier, a mixer, an oscillator, a DAC, and an ADC, and while only one antenna is shown in FIG. 16, the base station 1600 may have a plurality of antennas. The RF processor 1610 may include a plurality of RF chains and may perform beamforming by adjusting a phase and magnitude of each of signals transmitted and received via the plurality of antennas or antenna elements. The RF processor 1610 may perform a down-MIMO operation by transmitting one or more layers.

The baseband processor 1620 may perform conversion the baseband signal and a bit string according to a set physical layer specification of wireless access technology. For example, upon transmitting data, the baseband processor 1620 may generate complex symbols by encoding and modulating transmitted bit strings. Upon receiving data, the baseband processor 1620 may demodulate and decode the baseband signal provided from the RF processor 1610 to reconstruct received bit strings. For example, when data is transmitted according to an OFDM scheme, the baseband processor 1620 may generate complex symbols by encoding and modulating transmitted bit strings, map the complex symbols to subcarriers, and configure OFDM symbols by performing an IFFT operation and inserting a CP. Upon receiving data, the baseband processor 1620 may split the baseband signal provided from the RF processor 1610 into OFDM symbol units and restore the signals mapped to the subcarriers by performing an FFT operation and then reconstruct the received bit strings by performing demodulation and decoding. The baseband processor 1620 and the RF processor 1610 may transmit and receive signals as described above, and may be referred to as a transmitter, a receiver, a transmitter/receiver, or a communicator.

The backhaul communicator 1630 may provide an interface to perform communication between other nodes in a network.

The storage 1640 may store data such as a default program, an application program, and configuration information for the operation of the base station 1600 described above with reference to FIGS. 1 to 14. The storage 1640 may store information about a bearer allocated to an accessed UE, a measurement result reported from the accessed UE, and that is a reference for determining whether to provide or stop multiple connections to the UE. The storage 1640 may provide the stored data in response to a request from the controller 1650.

The controller 1650 may control overall operations of the base station 1600. For example, the controller 1650 may transmit and receive signals through the baseband processor 1620 and the RF processor 1610 or through the backhaul communicator 1630, and may record and read the data stored in the storage 1640. To do so, the controller 1650 may include at least one processor.

According to the embodiments, a UE that is dually accessed to each of a plurality of base stations may effectively perform a data recovery procedure when transmitting data via different links connected to each of the base stations.

Embodiments of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and data transmission through the Internet. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

Embodiments of the present disclosure are only illustrative of the present disclosure and are not intended to limit the scope of the present disclosure. That is, it is obvious to one of ordinary skill in the art that other modifications based on the technical idea of the present disclosure may be embodied. Each of the above embodiments may be combined with each other as needed. For example, the base station and the UE may operate by combining parts of the first, second, third, and fourth embodiments of the present disclosure. While the above embodiments are presented based on the NR system, other modifications based on the technical idea of the embodiments may be embodied in other systems such as a Frequency division duplex (FDD) LTE system or a time division duplex (TDD) LTE system.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving, from a base station, a radio resource control (RRC) message associated with a secondary cell group (SCG),
   performing a re-establishment associated with a radio link control (RLC) entity based on the RRC message;
   obtaining, from an upper layer of the terminal, information indicating a packet data convergence protocol (PDCP) data recovery based on the RRC message;
   identifying, based on the information indicating the PDCP data recovery, first PDCP data previously submitted to the re-established RLC entity, for which a successful delivery has not been confirmed by a lower layer;
   transmitting the identified first PDCP data to the base station;
   receiving, a PDCP status report from the base station;
   identifying, based on the PDCP status report, second PDCP data previously submitted to the re-established RLC entity, for which a successful delivery is confirmed; and
   discarding the identified second PDCP data.

2. The method of claim 1, wherein the terminal is connected to a master cell group (MCG) and the SCG.

3. The method of claim 2, wherein the RRC message is received from the base station associated with the MCG.

4. A terminal in a wireless communication system, the terminal comprising:
   a transceiver; and
   at least one controller configured to:
      receive, from a base station via the transceiver, a radio resource control (RRC) message associated with a secondary cell group (SCG),
      perform a re-establishment associated with a radio link control (RLC) entity based on the RRC message,
      obtain, from an upper layer of the terminal, information indicating a packet data convergence protocol (PDCP) data recovery based on the RRC message,
      identify, based on the information indicating the PDCP data recovery, first PDCP data previously submitted to the re-established RLC entity, for which a successful delivery has not been confirmed by a lower layer,
      transmit the identified first PDCP data to the base station,
      receive a PDCP status report from the base station,
      identify, based on the PDCP status report, second PDCP data previously submitted to the re-established RLC entity, for which a successful delivery is confirmed, and
      discard the identified second PDCP data.

5. The terminal of claim 4, wherein the terminal is connected to a master cell group (MCG) and the SCG.

6. The terminal of claim 5, wherein the RRC message is received from the base station associated with the MCG.

7. A non-transitory computer-readable recording medium having recorded thereon a program for executing a method, performed by a terminal, in a wireless communication system, the method comprising:
   receiving, from a base station, a radio resource control (RRC) message associated with a secondary cell group (SCG);
   performing a re-establishment associated with a radio link control (RLC) entity based on the RRC message;

obtaining, from an upper layer of the terminal, information indicating a packet data convergence protocol (PDCP) data recovery based on the RRC message;

identifying, based on the information indicating the PDCP data recovery, first PDCP data previously submitted to the re-established RLC entity, for which a successful delivery has not been confirmed by a lower layer;

transmitting the identified first PDCP data to the base station;

receiving a PDCP status report from the base station;

identifying, based on the PDCP status report, second PDCP data previously submitted to the re-established RLC entity, for which a successful delivery is confirmed; and discarding the identified second PDCP data.

8. A method performed by a base station in a wireless communication system, the method comprising:

transmitting, to a terminal, a radio resource control (RRC) message associated with a secondary cell group (SCG),
wherein a radio link control (RLC) entity of the terminal is re-established based on the RRC message,
wherein information indicating a packet data convergence protocol (PDCP) data recovery is obtained, by an upper layer of the terminal, based on the RRC message; and
wherein first PDCP data previously submitted to the re-established RLC entity, for which a successful delivery has not been confirmed by a lower layer of the terminal is identified based on the information indicating the PDCP data recovery;

receiving the identified first PDCP data from the terminal; and transmitting a PDCP status report to the terminal,
wherein based on the PDCP status report, second PDCP data previously submitted to the re-established RLC entity, for which a successful delivery is confirmed, is identified by the terminal, and
wherein the identified second PDCP data is discarded.

9. The method of claim 8, wherein the terminal is connected to a master cell group (MCG) and the SCG.

10. A base station in a wireless communication system, the base station comprising:

a transceiver; and at least one controller configured to:

transmit, to a terminal via the transceiver, a radio resource control (RRC) message associated with a secondary cell group (SCG),
wherein a radio link control (RLC) entity of the terminal is re-established based on the RRC message,
wherein information indicating a packed data convergence protocol (PDCP) data recovery is obtained, by an upper layer of the terminal, based on the RRC message, and
wherein first PDCP data previously submitted to the re-established RLC entity, for which a successful delivery has not been confirmed by a lower layer of the terminal is identified based on the information indicating PDCP data recovery;

receive the identified first PDCP data from the terminal; and transmit a PDCP status report to the terminal,
wherein based on the PDCP status report, second PDCP data previously submitted to the re-established RLC entity, for which a successful delivery is confirmed, is identified by the terminal, and
wherein the identified second PDCP data is discarded.

11. The base station of claim 10, wherein the terminal is connected to a master cell group (MCG) and the SCG.

* * * * *